US012779840B2

(12) United States Patent
Bauer

(10) Patent No.: US 12,779,840 B2
(45) Date of Patent: Nov. 3, 2026

(54) SHEET-FED PRINTING MACHINE COMPRISING A SIMULTANEOUS PRINTING INSPECTION DEVICE

(71) Applicant: KOENIG & BAUER AG, Würzburg (DE)

(72) Inventor: Stefan Bauer, Thüngersheim (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 19/473,877

(22) PCT Filed: Apr. 16, 2024

(86) PCT No.: PCT/EP2024/060261
§ 371 (c)(1),
(2) Date: Oct. 9, 2025

(87) PCT Pub. No.: WO2024/227595
PCT Pub. Date: Nov. 7, 2024

(65) Prior Publication Data

US 2026/0116064 A1 Apr. 30, 2026

(30) Foreign Application Priority Data

May 4, 2023 (DE) ..................... 10 2023 111 583.9

(51) Int. Cl.
*B41F 33/00* (2006.01)
*B41F 11/02* (2006.01)

(52) U.S. Cl.
CPC .......... *B41F 33/0036* (2013.01); *B41F 11/02* (2013.01)

(58) Field of Classification Search
None
See application file for complete search history.

(56) References Cited

U.S. PATENT DOCUMENTS

2014/0218502 A1 8/2014 Schaede et al.
2019/0224963 A1 7/2019 Numauchi et al.

FOREIGN PATENT DOCUMENTS

DE 19604241 A1 8/1996
DE 60133443 T2 4/2009
(Continued)

OTHER PUBLICATIONS

International Search Report of PCT/EP2024/060261 dated Jul. 4, 2024.

*Primary Examiner* — Leslie J Thompson
(74) *Attorney, Agent, or Firm* — MATTINGLY & MALUR, PC

(57) ABSTRACT

Examples include a sheet-fed printing machine including a sheet simultaneous printing unit having two collect cylinders, which are arranged on top of and in contact with one another. The machine includes a simultaneous printing inspection device and a sheet transport means that defines a section of a transport path for sheets. The section includes an inspection region of the simultaneous printing inspection device. The simultaneous printing inspection device includes a sensor device arranged to be aligned with the inspection region and the detection width of which is at least 80% of the working width. A guide device of the sensor device defines a sensor adjustment path provided for movement of the sensor device and that extends from the simultaneous inspection position to a maintenance position of the sensor device, and that extends linearly and parallel to a transverse direction at least between the simultaneous inspection position and the maintenance position.

15 Claims, 14 Drawing Sheets

(56) References Cited

FOREIGN PATENT DOCUMENTS

| | | | | | |
|---|---|---|---|---|---|
| DE | 102008006462 | A1 | | 7/2009 | |
| DE | 102011012807 | A1 | | 3/2012 | |
| DE | 102020106154 | A1 | | 9/2021 | |
| EP | 2202075 | A2 | | 6/2010 | |
| EP | 4043217 | A | | 8/2022 | |
| WO | 2007/006706 | A1 | | 1/2007 | |
| WO | WO-2012110265 | A1 | * | 8/2012 | .......... B41F 33/0036 |
| WO | 2018/167064 | A1 | | 9/2018 | |

* cited by examiner

SHEET-FED PRINTING MACHINE COMPRISING A SIMULTANEOUS PRINTING INSPECTION DEVICE

CROSS-REFERENCES TO RELATED APPLICATIONS

This application is the US national phase, under 35 USC § 371, of PCT/EP2024/060261, filed on 16 Apr. 2024, published as WO 2024/227595 A1 on 7 Nov. 2024, and claiming priority to DE 10 2023 111 583.9 filed on 4 May 2023, and all of which are expressly incorporated by reference herein in their entireties.

TECHNICAL FIELD

Examples herein relate to a sheet-fed printing machine comprising a simultaneous printing inspection device. The sheet-fed printing machine includes at least one sheet-fed printing unit configured as a sheet simultaneous printing unit, which includes a first collect cylinder and a second collect cylinder, which are arranged so as to directly cooperate with one another. Each collect cylinder has an axis of rotation and an axial plane, which is a plane that includes both the axis of rotation of the first collect cylinder and the axis of rotation of the second collect cylinder. A reference plane is a plane that includes at least one axis of rotation of one of the collect cylinders, and has a horizontal surface normal. The two collect cylinders are arranged in such a way that the angle of intersection between the axial plane on the one hand and the reference plane on the other hand is no more than 45°. The sheet-fed printing machine further includes at least one simultaneous printing inspection device arranged downstream from the at least one sheet simultaneous printing unit for inspecting printed sheets. A transport direction is defined at every point along a transport path provided for the transport of sheets and a transverse direction is a horizontal direction that is orthogonal with respect to the transport direction at every point of the transport path provided for the transport of sheets. The sheet-fed printing machine includes at least one sheet transport means, which is assigned to the simultaneous printing inspection device, and which defines a section of the transport path provided for the transport of sheets. This section includes an inspection region of the simultaneous printing inspection device, and the simultaneous printing inspection device includes at least one sensor device, which in a simultaneous inspection position is arranged so as to be aligned with the inspection region of the simultaneous printing inspection device.

BACKGROUND

A machine for handling sheets is known from WO 2007/006706 A1, which comprises at least one inspection device for the in particular optical inspection of sheets.

Printing machines comprising respective sheet simultaneous printing units are known from WO 2018/167064 A1, wherein inspection devices using mirrors are disclosed in connection with separable and movable machine frames.

A machine for handling sheets is known from DE 10 2011 012 807 A1, which comprises an inspection device and an illumination device pivotably arranged about a pivot axis.

A machine for handling sheets is known from DE 196 04 241 A1, which comprises an inspection device and two illumination devices.

A machine for handling sheets is known from DE 10 2008 006 462 A1 and DE 601 33 443 T2, which comprise an inspection device including a sensor device that can be moved in a transverse direction.

A printing machine is known from EP 2 202 075 A2, having an inspection device that only detects a relatively narrow region of a printing substrate and can be moved in a transverse direction for this purpose so as to detect the entire width of the printing substrate over multiple measurements.

A sheet-fed printing machine is known from DE 10 2020 106 154 A1, which comprises a simultaneous printing unit including two collect cylinders arranged on top of one another and a downstream inspection device including inspection units that are aligned with an inspection region of a transport path.

A machine is known from US 2019/0224963 A1, by means of which prints and numberings can be applied to sheets having reflecting sections, wherein the machine comprises an inspection device including a pivotable camera or pivotable illumination device so as to optimize an illumination, wherein the pivot axis runs parallel to a transverse direction.

A sheet-fed printing machine is known from EP 4 043 217 A1, which comprises an inspection device that can be pivoted about an axis and has a camera and an illumination device, wherein the pivot axis extends parallel to a transverse direction and the camera can be moved into a maintenance position.

A sheet-fed intaglio printing press is known from US 2014/0218502 A1, which comprises an inspection device. A modification in which sheet transport cylinders must be removed and chain wheels must be newly arranged allows the inspection device to be removed and the machine to be operated without the inspection device.

SUMMARY

It is an object of some examples herein to provide a sheet-fed printing machine comprising a simultaneous printing inspection device.

The object is achieved according to some examples herein by the sheet-fed printing machine discussed above. The sheet-fed printing machine has a maximum working width of at least 50 cm, and the at least one sensor device of the simultaneous printing inspection device has a detection width which is at least 80% of the maximum working width. At least one guide device of the at least one sensor device of the simultaneous printing inspection device is provided, and defines a sensor adjustment path that is provided for movement of the at least one sensor device of the simultaneous printing inspection device. The at least one sensor device extends from the simultaneous inspection position at least to a backed-away position of the sensor device of the simultaneous printing inspection device which is configured as a maintenance position. The sensor adjustment path extends linearly and parallel to the transverse direction, at least between the simultaneous inspection position and the backed-away position of the sensor device of the simultaneous printing inspection device, which is designed as a maintenance position.

A machine for handling and preferably also for processing sheets comprises at least one inspection device for the in particular optical inspection of sheets. The machine comprises at least one sheet transport means, which defines a section of a transport path provided for a transport of sheets. This section comprises an inspection region. The inspection device comprises at least one in particular optical sensor device, which is arranged so as to be aligned with the inspection region. The inspection region is in particular a sub-section of that section of the transport path which is defined by the sheet transport means and can be detected by the sensor device.

In one refinement, at least one guide device of the at least one sensor device is provided, which defines a sensor adjustment path that is provided for a movement of the at least one sensor device and that extends from the inspection position at least to a first backed-away position of the at least one sensor device designed as a maintenance position of the at least one sensor device. The sensor adjustment path extends in particular exclusively orthogonal with respect to a transverse direction, at least between the inspection position and the first backed-away position. A relevant region of the sensor device can thus be sufficiently exposed, without having to move the sensor device an unnecessarily large distance. This also allows line connections for the backing-away movement to be connected. In an alternative or additional refinement, the machine is preferably characterized in that at least one connecting line of the at least one sensor device is arranged so as to allow a movement of the at least one sensor device between the inspection position and the first backed-away position, while a line connection ensured by this particular connecting line is preserved. In an alternative or additional refinement, the machine is preferably characterized in that the at least one sensor device, in the first backed-away position thereof, is accessible for cleaning and/or can be removed from the machine.

In an alternative or additional refinement, the machine is preferably characterized in that the sensor adjustment path extends in particular exclusively orthogonal with respect to the transverse direction over a length of at least 10 cm, preferably at least 20 cm, more preferably at least 30 cm, still more preferably at least 40 cm, and still more preferably at least 50 cm.

In an alternative or additional refinement, the machine is preferably characterized in that the sensor adjustment path is at least partly curved and/or that the at least one sensor device, in the first backed-away position thereof, points in a different direction than in the inspection position thereof. The sensor adjustment path can then be kept as short as possible, while nonetheless optimizing accessibility.

In an alternative or additional refinement, the machine is preferably characterized in that the at least one guide device of the at least one sensor device comprises at least two rails, by which the sensor adjustment path is defined. This allows a particularly precise movement of the sensor device.

In an alternative or additional refinement, the machine is preferably characterized in that at least one first holding element is arranged in such a way that, when the sensor device is arranged in the inspection position, it is necessary to switch a device and/or overcome a holding force to be able to move the sensor device out of this inspection position. This enables a high inspection quality. In an alternative or additional refinement, the machine is preferably characterized in that the at least one sensor device is designed as an optical sensor device and/or as a camera and/or as a line camera. In an alternative or additional refinement, the machine is preferably characterized in that the sheet transport means is designed as a rotational transport body and/or that the sheet transport means is designed as a suction drum. This enables a high inspection quality.

In an alternative or additional refinement, the machine is preferably characterized in that the inspection device comprises at least one first illumination device, which is arranged so as to be aligned with the inspection region. The first illumination device is preferably pivotably arranged about a first pivot axis, in particular for switching the first illumination device between different illumination positions. This allows print images to be inspected, whose appearance is variable or dependent on the viewing angle and/or illumination angle. For example, corresponding print images can in part only be inspected with sufficient precision when the direction of the illumination and the direction of the detection are matched to one another. In particular, the first illumination device is preferably pivotably arranged about the first pivot axis independently of the at least one sensor device. The first pivot axis is preferably oriented parallel to a transverse direction. The first pivot axis preferably intersects the inspection region or the first pivot axis has a smallest distance with respect to the inspection region, which is no more than 20 mm, more preferably no more than 10 mm, and still more preferably no more than 5 mm.

In an alternative or additional refinement, the machine is preferably characterized in that the first illumination device is pivotably arranged about the first pivot axis in a first angular range delimited by two end positions, and that this first angular range extends over at least 5°, more preferably at least 8°, and still more preferably at least 10°.

In an alternative or additional refinement, the machine is preferably characterized in that a backing-away guide device of the first illumination device is provided, which defines an adjustment path of the first illumination device along which the at least one first illumination device can be moved between at least one illumination position of the at least one first illumination device and at least one maintenance position of the at least one first illumination device. The adjustment path of the first illumination device is preferably linear and/or preferably runs parallel to the transverse direction. In an alternative or additional refinement, the machine is preferably characterized in that the respective illumination position of the at least one first illumination device and the maintenance position of the at least one first illumination device differ in the positioning thereof relative to the transverse direction. This allows the illumination device to be removed even when there are space constraints.

The at least one first illumination device is preferably designed to illuminate the inspection region with at least predominantly directed light. This allows a precise inspection. In an alternative or additional refinement, the machine is preferably characterized in that the inspection device comprises at least one second illumination device, which is arranged so as to be aligned with the inspection region. The at least one second illumination device is preferably designed to illuminate the inspection region with at least predominantly diffuse light. This makes it possible to achiever overall greater brightness and thus an enhanced inspection quality.

In an alternative or additional refinement, the machine is preferably characterized in that, in the working position, the inspection device is arranged between the at least one first illumination device assigned thereto and the at least one second illumination device assigned thereto. Both illumination devices can then be arranged as close as possible to the sensor device.

In an alternative or additional refinement, the machine is preferably characterized in that the at least one first illumination device is designed as a device for emitting electromagnetic radiation in the visible range and/or as a device for emitting electromagnetic radiation in the infrared range and/or as a device for emitting electromagnetic radiation in the ultraviolet range. A deliberate switchability between these ranges is preferred. This allows multifaceted usability of the inspection device.

In an alternative or additional refinement, the machine is preferably characterized in that the machine comprises at least two such inspection devices, and that a first inspection device for inspecting a first side of a respective sheet is provided, and that a second inspection device for inspecting a second side of the respective sheet which is located opposite the first side of the respective sheet is provided.

The machine is preferably designed as a sheet-fed printing machine and/or as a sheet-fed securities printing machine. The machine preferably comprises a pile delivery and/or a multiple pile delivery unit. The machine preferably comprises at least one sheet feeder. In an alternative or additional refinement, the machine is preferably characterized in that the machine is designed as comprising at least one screen printing unit. In an alternative or additional refinement, the machine is preferably characterized in that the machine comprises at least one alignment device for aligning particles that are contained in an optically variable coating agent that is applied to the respective sheet and that are responsible for optical variability. In an alternative or additional refinement, the machine is preferably characterized in that the alignment device comprises at least one alignment cylinder, which is in particular designed as a rotational transport body and/or as a magnetically active alignment cylinder. Appropriately adapted and flexible illumination options are in particular of advantage with such printing inks. The term of a sheet-fed printing machine shall preferably also be understood to mean a sheet numbering machine and/or a sheet flexographic printing machine and/or a sheet varnishing machine.

In an alternative or additional refinement, the machine is preferably characterized in that the machine has a maximum working width of at least 50 cm and/or that the at least one optical sensor device has a detection width that is at least 80% of the maximum working width.

In an alternative or additional refinement, the machine is preferably characterized by being designed as a sheet-fed printing machine and comprises at least one sheet-fed printing unit designed as a sheet simultaneous printing unit, which comprises a first collect cylinder and a second collect cylinder, which are arranged so as to be directly in contact with one another and/or directly cooperate with one another and which each have an axis of rotation, wherein an axial plane is a plane that includes both the axis of rotation of the first collect cylinder and the axis of rotation of the second collect cylinder. A reference plane is preferably a plane that includes at least one axis of rotation of such a collect cylinder and has a horizontal surface normal. These two collect cylinders are preferably arranged in such a way that the angle of intersection between the axial plane on the one hand and the reference plane on the other hand is no more than 45°, more preferably no more than 20°, still more preferably no more than 5°, and still more preferably no more than 0.5°.

In an alternative or additional refinement, the sheet-fed printing machine is preferably characterized by comprising at least one simultaneous printing inspection device, arranged downstream from the at least one sheet simultaneous printing unit, for inspecting sheets printed in particular by means of the at least one sheet simultaneous printing unit, and that the sheet-fed printing machine comprises at least one sheet transport means which is assigned to the simultaneous printing inspection device and defines a section of a transport path provided for a transport of sheets. This section preferably comprises an inspection region of the simultaneous printing inspection device. The simultaneous printing inspection device preferably comprises at least one in particular optical sensor device, which in a simultaneous inspection position is arranged so as to be in particular directly aligned with the inspection region of the simultaneous printing inspection device. The at least one sensor device is preferably designed as a camera and/or as a line camera. The corresponding sheet transport means is preferably designed as a rotatable sheet transport means, in particular as a suction drum. The corresponding sheet transport means preferably forms a first transfer point together with one of the collect cylinders. Preferably, at least one guide device of the at least one sensor device of the simultaneous printing inspection device is provided, which defines a sensor adjustment path that is provided for a movement of the at least one sensor device of the simultaneous printing inspection device and that extends from the simultaneous inspection position at least to a backed-away position of the sensor device of the simultaneous printing inspection device which is designed as a maintenance position. This sensor adjustment path preferably extends linearly and parallel to a transverse direction, more preferably exclusively linearly, at least between the simultaneous inspection position and the backed-away position of the sensor device of the simultaneous printing inspection device which is designed as a maintenance position.

In an alternative or additional refinement, the sheet-fed printing machine is preferably characterized in that the simultaneous printing inspection device comprises at least one illumination device, which in an illumination position is arranged so as to be in particular directly aligned with the inspection region of the simultaneous printing inspection device. More preferably, at least one backing-away guide device of the at least one illumination device of the simultaneous printing inspection device is provided, which defines an illumination adjustment path that is provided for a movement of the at least one illumination device of the simultaneous printing inspection device and that extends from the illumination position at least to a backed-away position of the illumination device of the simultaneous printing inspection device which is designed as a maintenance position. This illumination adjustment path preferably extends linearly and parallel to the transverse direction, more preferably exclusively linearly, at least between the illumination position and the backed-away position of the illumination device of the simultaneous printing inspection device.

In an alternative or additional refinement, the machine, which is in particular designed as a sheet-fed printing machine, is preferably characterized in that the machine, in particular the sheet-fed printing machine, has a maximum working width of at least 50 cm and that the at least one sensor device of the simultaneous printing inspection device has a detection width that is at least 80% of the maximum working width.

In an alternative or additional refinement, the sheet-fed printing machine is preferably characterized in that the illumination position of the at least one illumination device of the simultaneous printing inspection device and the maintenance position of the at least one illumination device of the simultaneous printing inspection device differ in the positioning thereof relative to the transverse direction, in particular by a length that corresponds to at least the working width of the sheet-fed printing machine and/or at least the clear width of the sheet-fed printing machine, in particular at least a sum of the clear width and a dimension of a frame side wall of the frame of the sheet-fed printing machine in the transverse direction in the region of the sheet simultaneous printing unit. In an alternative or additional refinement, the sheet-fed printing machine is preferably characterized in that the backing-away guide device of the at least one illumination device of the simultaneous printing inspection device comprises a rail and/or multiple roller elements.

In an alternative or additional refinement, the sheet-fed printing machine is preferably characterized in that the inspection position of the sensor device of the simultaneous printing inspection device and the backed-away position, designed as the maintenance position, of the sensor device of the simultaneous printing inspection device differ in the positioning thereof relative to the transverse direction, in particular by a length that corresponds to at least the working width of the sheet-fed printing machine and/or at least the clear width of the sheet-fed printing machine, in particular at least a sum of the clear width and a dimension of a frame side wall of the frame of the sheet-fed printing machine in the transverse direction in the region of the sheet simultaneous printing unit. In an alternative or additional refinement, the sheet-fed printing machine is preferably characterized in that the guide device of the sensor device of the simultaneous printing inspection device comprises a rail and/or multiple roller elements.

In an alternative or additional refinement, the sheet-fed printing machine is preferably characterized in that the sheet simultaneous printing unit comprises exactly four forme cylinders, of which exactly two are arranged so as to be directly in contact with and/or so as to directly cooperate with the first collect cylinder and of which exactly two others are arranged so as to be directly in contact with and/or so as to cooperate directly with the second collect cylinder. More preferably, the sheet-fed printing machine is additionally characterized in that at least one inking unit is provided per forme cylinder, which has at least one respective ink reservoir, and that least one reservoir cutting plane is defined for each ink reservoir, which both intersects this ink reservoir and includes the axis of rotation of the forme cylinder which cooperates with the inking system and/or is arranged so as to be capable of cooperating with the inking system that contains this ink reservoir, and that an angle of intersection between the reference plane on the one hand and at least one such reservoir cutting plane of the respective ink reservoir on the other hand is no more than 45°, more preferably no more than 35°, still more preferably no more than 25°, and still more preferably no more than 20°.

Along the transport path provided for the transport of sheets, a transport direction is defined at each point, in particular as the direction which, at the corresponding point of the provided transport path, is oriented so as to be tangential thereto and parallel to the movement of the sheets provided at this point. The transverse direction is a horizontal direction orthogonal with respect to the transport direction at every point of the transport path provided for the transport of sheets. The at least one sheet transport means is preferably designed as a rotatable sheet transport means, the axis of rotation of which extends in the transverse direction.

BRIEF DESCRIPTION OF THE DRAWINGS

Exemplary embodiments of the invention are illustrated in the drawings and will be described in greater detail below. The figures show.

DETAILED DESCRIPTION

Figure 1:
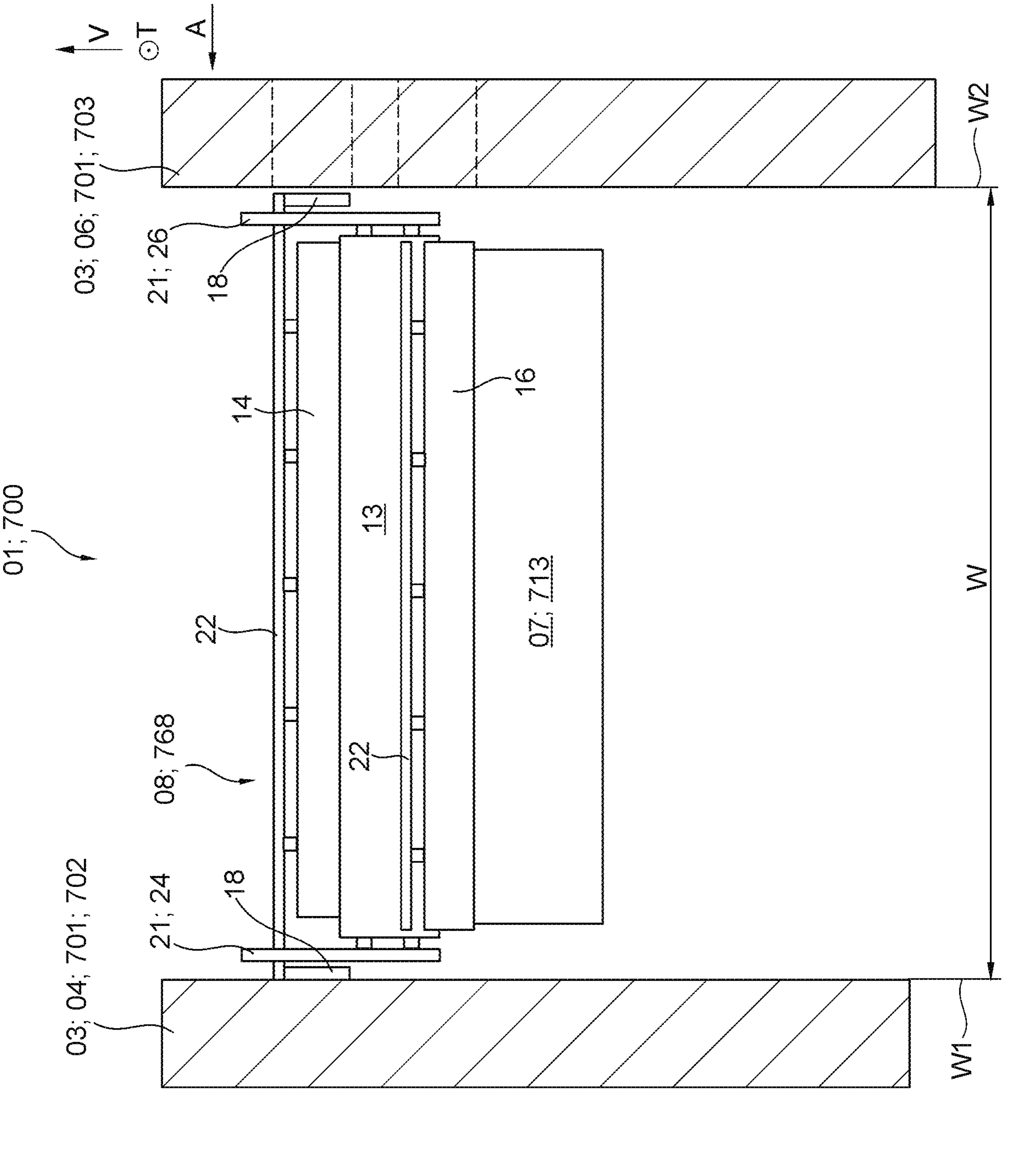
FIG. 1 a schematic representation of a section through a frame of a machine, wherein a rotational transport body and an inspection device arranged in the vicinity thereof and comprising a sensor device, illustration devices and guide devices are visible as an elevation.
Figure 2:
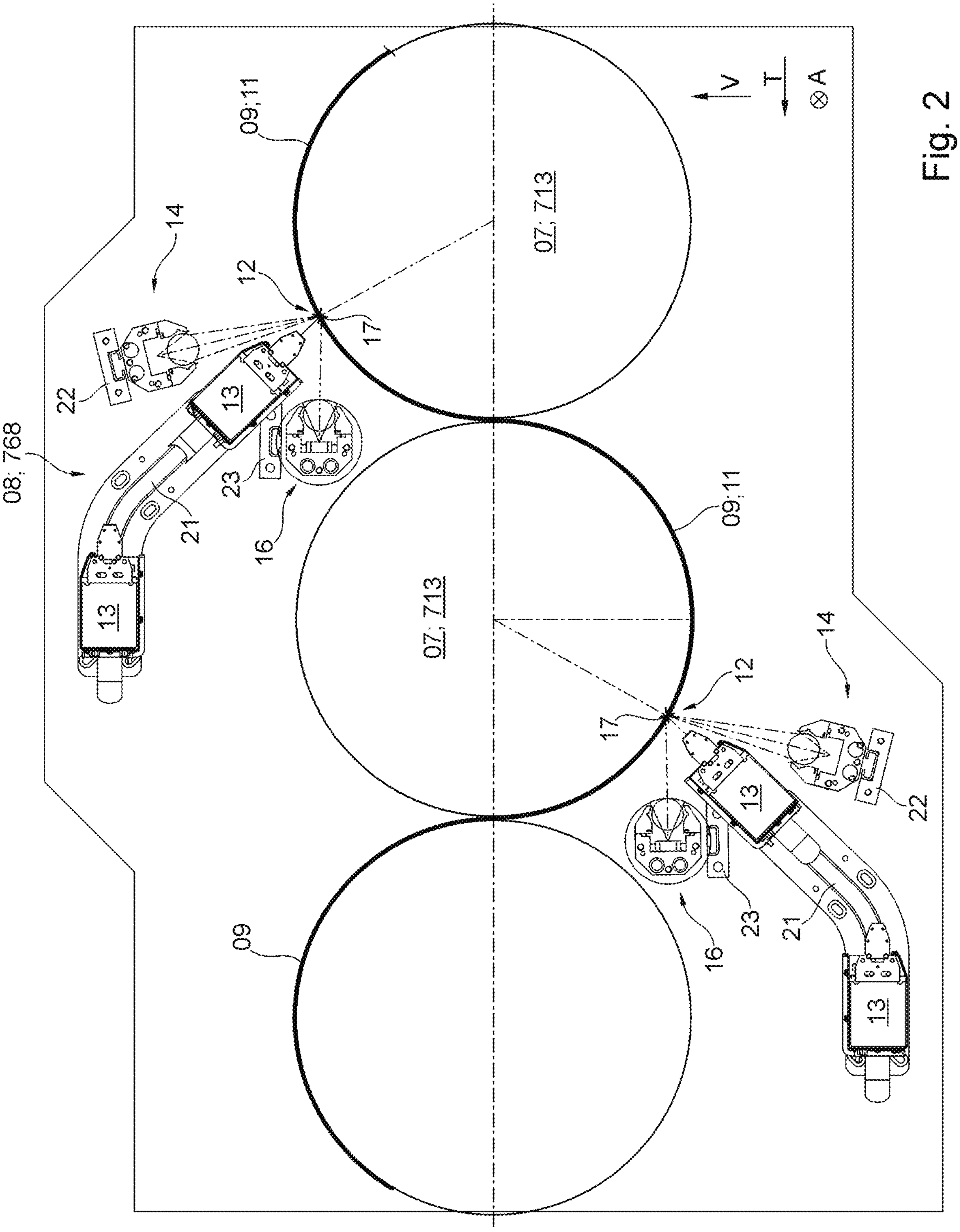
FIG. 2 a schematic representation of a part of a transport path provided for a transport of sheets in the region between two inspection devices, wherein different angular positions are indicated, from which illumination devices can illuminate a respective inspection region, and wherein a rotational transport body having an assigned inspection device according to FIG. 1 is shown in the right part.
Figure 3A:
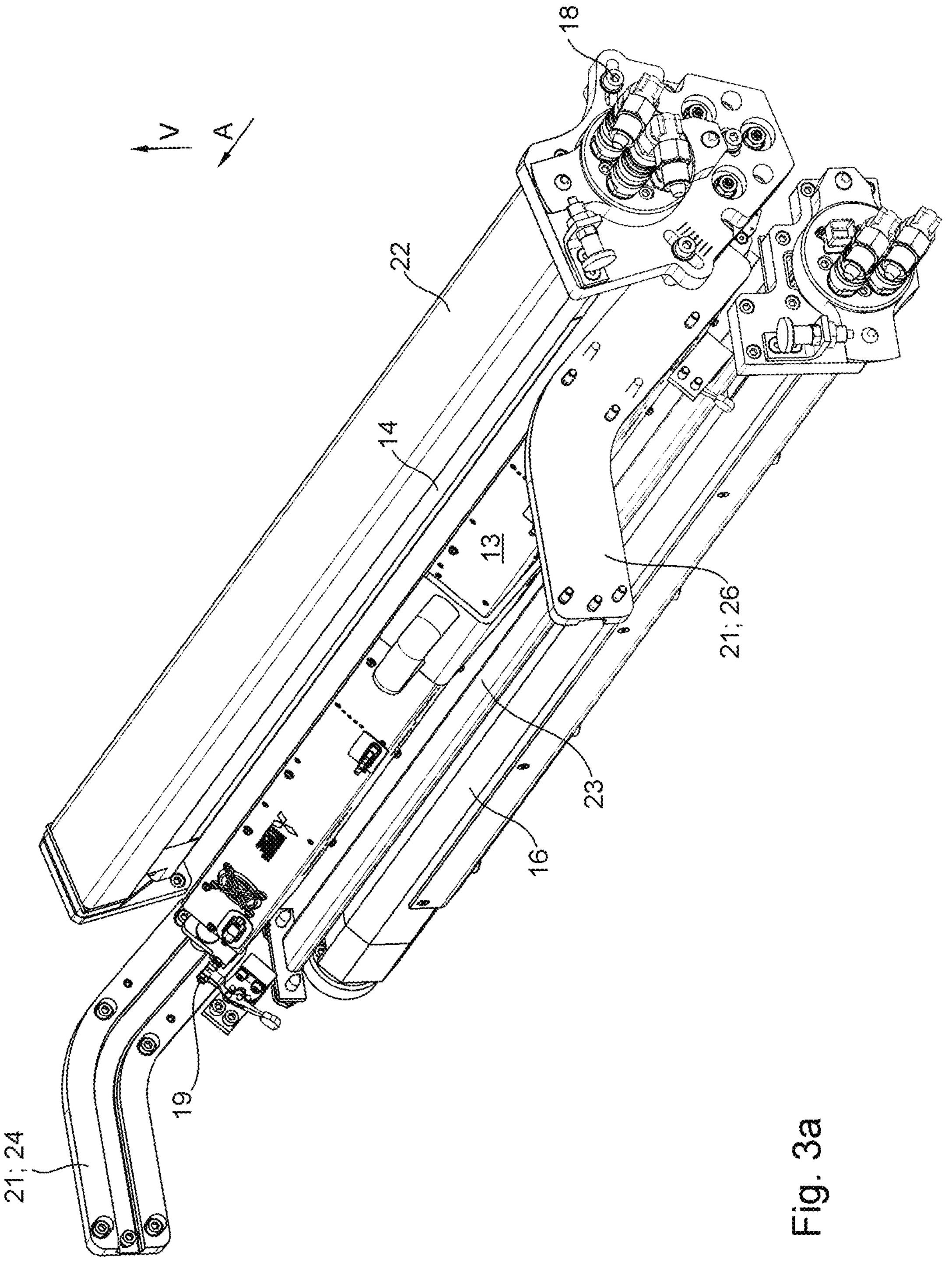
FIG. 3*a* a schematic representation of a sensor device and two illumination devices of an inspection device in an oblique view.
Figure 3B:
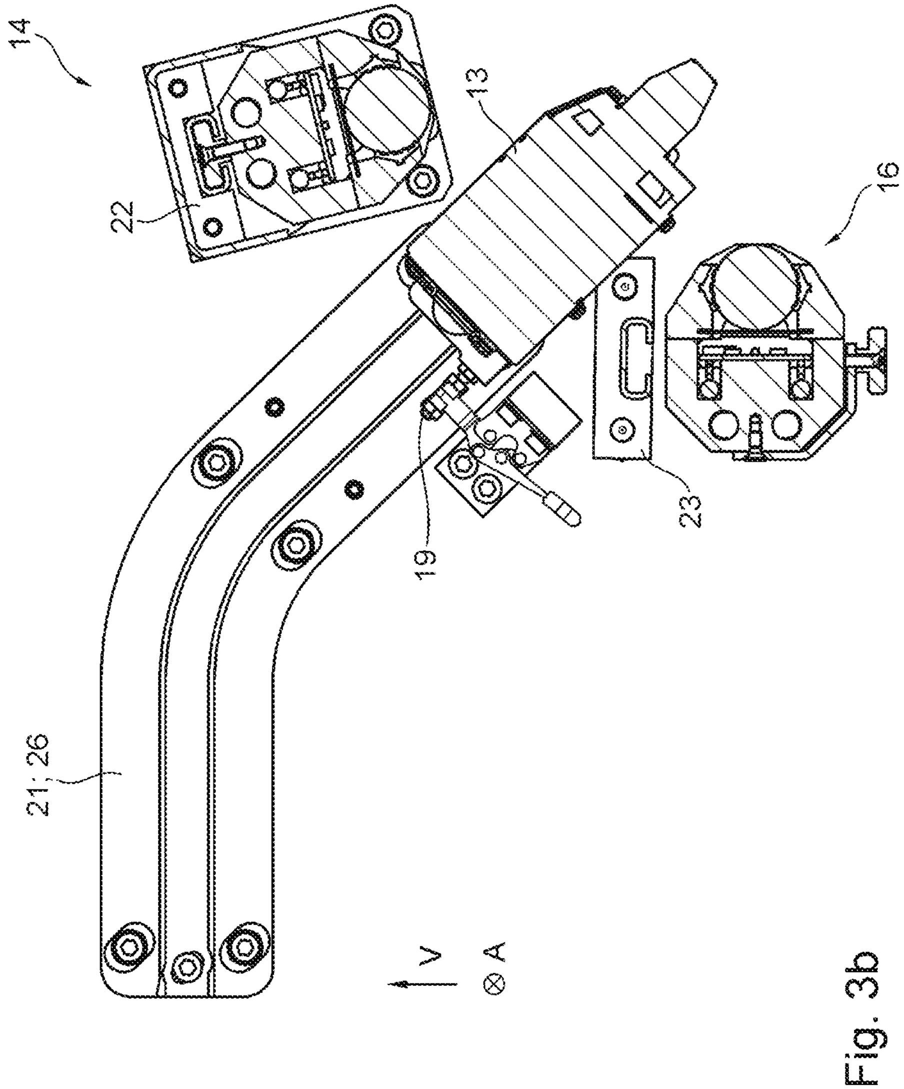
FIG. 3*b* a schematic representation of a sensor device and two illumination devices of an inspection device in a lateral sectional illustration.
Figure 3C:
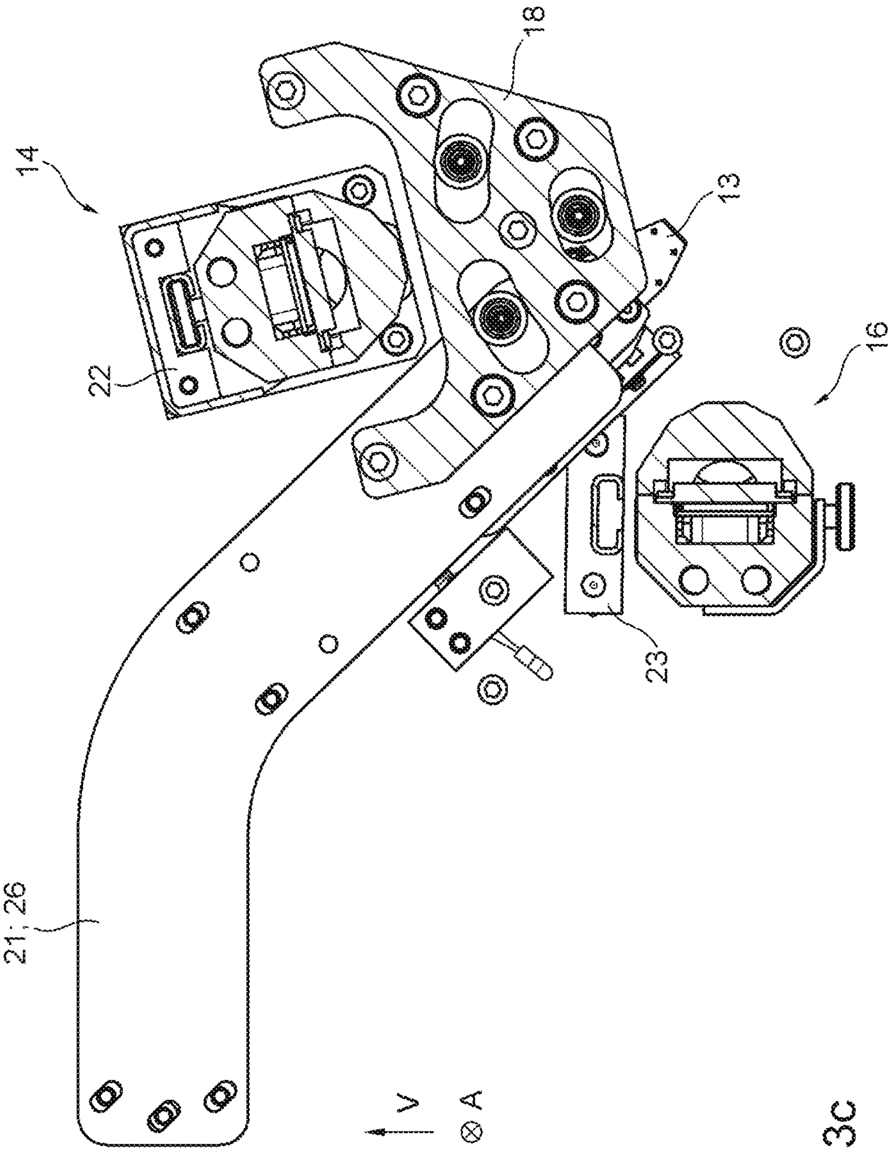
FIG. 3*c* a schematic representation of a sensor device and two illumination devices of an inspection device in a lateral sectional illustration.
Figure 3D:
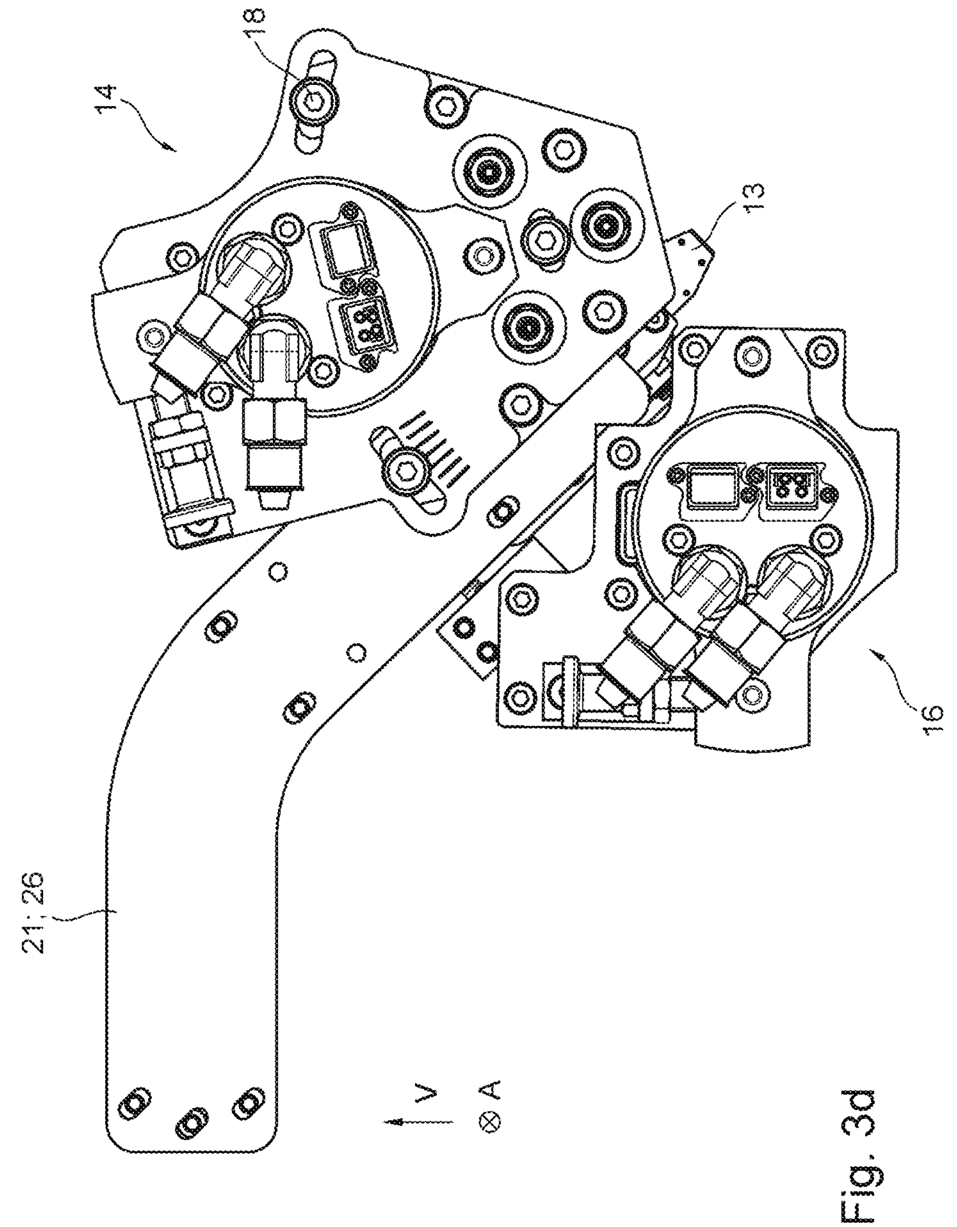
FIG. 3*d* a schematic representation of a sensor device and two illumination devices of an inspection device in a lateral view.

A machine 01 for handling sheets is at least also used to inspect sheets. These sheets are sheets of a particular substrate. The machine 01, for example, comprises further devices which can, for example, be used to process the sheets. Examples include coating devices such as priming devices and/or printing devices and/or varnishing devices or shaping devices such as cutting devices and/or die-cutting devices and/or perforating devices and/or folding devices. The machine 01 is thus preferably designed as an inspection machine 01. For example, the machine 01 is additionally designed as a sheet processing machine 01, preferably coating machine 01, in particular printing machine 01. When above and/or below a coating machine 01, in particular printing machine 01, is shown by way of example, corresponding information also applies to a pure inspection machine 01, provided this does not result in any contradictions. For example, the machine 01 is additionally or alternatively designed as a shaping machine 01. The machine 01 is preferably designed as a machine 01 for handling securities sheets, in particular as a securities handling machine 01 and/or securities inspection machine 01 and/or securities printing machine 01. For example, the machine 01 is designed as a sheet-fed printing machine 01, in particular sheet-fed rotary printing machine 01 or more preferably as a sheet-fed securities printing machine 01.

The machine 01 comprises at least one inspection device 08; 768 for inspecting sheets. This at least one inspection device 08; 768 is preferably arranged so as to detect sheets transported past the inspection device. A transport path provided for a transport of sheets is preferably assigned to the machine 01. This path preferably begins at a substrate feed device 100. The substrate feed device 100 is designed, for example, as a sheet feed device 100, in particular a sheet feeder 100. The machine 01 thus preferably comprises at least one sheet feeder 100. As an alternative, the machine 01 comprises at least one roll unwinding device and at least one cross-cutting device.

The machine 01 comprises, for example, at least one sheet processing unit 200; 500; 600; 700. The at least one sheet processing unit 200; 500; 600; 700 is designed as a sheet-fed printing unit 200; 500; 600; 700, for example. Depending on the embodiment, different printing methods are possible.

The sheets are formed, for example, of cellulose-based or preferably cotton fiber-based paper, of plastic polymer or of a hybrid product thereof. Prior to being inspected and/or processed by the machine 01, the sheets may be uncoated or may already have been coated. The sheets may be unprinted or already have been printed once or multiple times or have been mechanically processed in another manner. Preferably, several multiple-up copies, in particular print images of banknotes to be produced, are arranged in a row next to one another on a sheet, and several such rows of multiple-up copies or the print image thereof are arranged one behind the other in the transport direction T or are accordingly arranged in the course of a processing operation of the particular sheet.

The substrate feed device 100 or the sheet feed device 100 of the machine 01 is preferably arranged at the start of the transport path provided for the transport of substrate, in particular sheets. The at least one substrate feed device 100 preferably includes a conveyor line 101 designed, for example, as a feed table 101. For example, at least one receiving unit designed as a pile board is provided. It is then possible for printing substrate bundles, designed as sheet piles, to be arranged thereon for separation. The receiving unit is preferably connected to at least one transport means, which ensures that the respective uppermost sheet of the sheet pile is arranged in a defined position, including when the sheet pile is being processed. The substrate feed device 100 preferably comprises sheet separation elements and sheet transport elements. The sheet separation elements are designed as separating suckers, for example. The sheet transport elements are designed as transport suckers, for example. Preferably, at least one front stop is provided. For example, the substrate feed device 100 comprises at least one non-stop device for an uninterrupted supply of sheets, including when a succeeding pile is provided. The feed table arranged downstream from the sheet pile is designed as a suction feed table. For example, at least one infeed device referred to as a sheet infeed is provided, which preferably comprises a feed table and comprises at least one movable front stop. The sheet feeder 100 preferably comprises at least one rocking gripper or rocker. A receiving drum 102 is preferably arranged downstream from the rocking gripper along the transport path provided for the transport of sheets. Preferably, sheets are transferred from the rocking gripper to the receiving drum 102. The receiving drum 102 is a rotational transport body 102.

The machine 01 preferably comprises at least one unit 900 designed as a delivery device 900, in particular sheet delivery 900, in particular in addition to the at least one inspection device 08; 768 and optionally in addition to the at least one sheet processing unit 200; 500; 600; 700. The sheet delivery 900 preferably comprises at least one sheet conveyor system 904, which is in particular designed as a chain conveyor system 904 or chain gripper system 904. The sheet conveyor system 904 comprises, for example, traction means moved by way of driving and deflection means, which drive gripping devices for conveying the sheets. The gripping devices comprise fixing elements for receiving and fixing the sheets. Fixing elements that can be used include grippers, in particular clamping and/or suction grippers for gripping the sheet edges. By means of the sheet delivery 900, the sheets are preferably deposited onto at least one, or more preferably one of multiple transport bases, which are, for example, designed as a pallet or in another manner, in the form of a respective delivery pile. For example, a sheet guide device and/or a drying and/or curing device 906 are arranged in the sheet delivery 900. The sheets, which are preferably decelerated by a braking system, bear against front stops and in this way are deposited in an aligned manner onto the particular delivery pile. For example, the sheet delivery 900 is equipped with a non-stop device for transporting delivery piles away without interruption.

In an advantageous refinement, especially in conjunction with a delivery device 900 comprising multiple pile spaces, the at least one inspection device 768 is arranged downstream from a last alignment device 771, along the transport path provided for the transport of sheets. Sheets deemed to be defective or to have a faulty print image can then be collected on one of the piles, while so-called good sheets are deposited onto a different pile.

For example, the delivery device 900, along the transport path provided for the transport of the sheets, comprises at least two, more preferably at least three, delivery stations 901; 902; 903 that are arranged one behind the other along the transport path provided for the transport of substrate. The at least one delivery device 900 is thus preferably designed as a multiple pile delivery unit 900, in particular at least as a dual pile delivery unit 900 or at least as a triple pile delivery unit 900 or at least as a quadruple pile delivery unit 900. The delivery stations 901; 902; 903 are also referred to as pile deliveries 901; 902; 903. A respective delivery station 901; 902; 903 or pile delivery 901; 902; 903 shall in particular be understood to mean a device that is used for forming a respective pile.

The transport path provided for the transport of in particular at least partially separated sheets preferably starts at the substrate feed device 100 and/or preferably ends at the sheet delivery 900. The transport path provided for the transport of sheets, and more preferably every section 11 thereof, is preferably a spatial area. Piles comprising several sheets are preferably fed to the substrate feed device 100 and/or removed from the sheet delivery 900. The transport path of these piles shall not be considered to be part of the transport path provided for the transport of sheets. For example, at least one full sheet control device 773 is arranged along the transport path provided for the transport of sheets. This device is used, in particular, to detect an arrival at an expected time and/or an expected shape of side edges of the sheets. The full sheet control device 773 comprises, for example, at least one source for electromagnetic radiation, in particular visible light, and a sensor for electromagnetic radiation, in particular visible light.

In the case of a curved transport path, a transport direction T is preferably in each case the direction T that runs tangential to a segment and/or point of the provided transport path closest to a respective reference point and that is provided for the transport of the substrate and/or sheet at this segment and/or point. This particular reference point is preferably situated at the point and/or at the component that is being related to the transport direction T. The transport direction T thus preferably in each case extends along the transport path provided for substrate and/or sheets. Along the transport path provided for the transport of sheets, the transport direction T is defined at each point, in particular as the direction T which, at the corresponding point of the provided transport path, is oriented so as to be tangential thereto and parallel to the movement of the sheets provided at this point. A transverse direction A is preferably a direction A that extends orthogonal with respect to the transport direction T and horizontally. The transverse direction A is preferably oriented orthogonal with respect to a vertical direction V.

A working width of the machine 01 is preferably a dimension that extends orthogonal with respect to the transport path 09 provided for the transport of sheets through the machine 01 and/or in the transverse direction A. The working width of the machine 01 preferably corresponds to a maximum width that a sheet is permitted to have for the machine 01 to still be able to work it, that is, in particular a maximum sheet width that can be processed by the machine 01. The width of a sheet shall, in particular, be understood to mean the dimension thereof in the transverse direction A. This preferably applies regardless of whether this width of the sheet is greater than or less than a horizontal dimension of the sheet orthogonal thereto, which more preferably represents the length of this sheet. The working width of the machine 01 preferably corresponds to a working width of individual components of the machine 01. The machine 01 preferably has a maximum working width of at least 50 cm, more preferably at least 75 cm, and still more preferably at least 100 cm. The machine 01 preferably comprises an in particular stationary frame 03, which has at least two in particular stationary frame side walls 04; 06.

The machine 01 for handling and preferably also for processing sheets comprises at least one inspection device 08; 768 for the in particular optical inspection of sheets. The machine 01 comprises at least one sheet transport means 07; 708; 709; 711; 712; 713; 714, which defines a section 11 of a transport path 09 provided for a transport of sheets. This section 11 includes an inspection region 12, wherein the inspection device 08; 768 comprises at least one in particular optical sensor device 13 which is arranged so as to be aligned with the inspection region 12. In particular, the inspection region 12 is a sub-section of the section 11 of the transport path 09 which is defined by the sheet transport means 07; 708; 709; 711; 712; 713; 714, and more particularly the sub-section which can be detected by the sensor device 13. The sheet transport means 07; 708; 709; 711; 712; 713; 714 is preferably designed as a rotational transport body 07; 708; 709; 711; 712; 713; 714, more preferably as a suction drum 713. A rotational transport body 708; 709; 711; 712; 713; 714 shall preferably be understood to mean an assembly 708; 709; 711; 712; 713; 714 that is arranged rotatably about a respective axis of rotation and is used to transport sheets. In particular, a respective section of the transport path provided for the transport of sheets is defined by the respective sheet transport means 708; 709; 711; 712; 713; 714, wherein this section preferably essentially has the shape of a sub-area of a cylinder shell. Preferably, the at least one inspection device 768 is arranged so as to be aligned with a supporting surface of a suction drum 713. As a result of suction being applied to the respective sheet, the position thereof on the suction drum 713 is especially stable. This makes it possible to carry out an inspection with particularly high precision. The sheet transport means 07; 708; 709; 711; 712; 713; 714 is preferably designed as a rotatable sheet transport means 07; 708; 709; 711; 712; 713; 714, the axis of rotation of which extends in the transverse direction A. The inspection device 08; 768 comprises at least one first illumination device 14, which is arranged so as to be aligned with the inspection region 12.

The at least one sensor device 13 is preferably designed as an optical sensor device 13, in particular as a camera 13 and more preferably as a line scan camera 13. The at least one optical sensor device 13 preferably has a detection width that is at least 80%, more preferably at least 90%, and still more preferably at least 95% of the maximum working width.

Preferably, at least one guide device 21 of the at least one sensor device 13 is provided, which defines a sensor adjustment path that is provided for a movement of the at least one sensor device 13 and that extends from the inspection position at least to a first backed-away position designed as a maintenance position. The sensor adjustment path preferably extends orthogonal with respect to the transverse direction A, more preferably exclusively orthogonal with respect to the transverse direction A, at least between the inspection position and the first backed-away position. The sensor adjustment path preferably extends in particular exclusively orthogonal with respect to the transverse direction A over a length of at least 10 cm, more preferably at least 20 cm, still more preferably at least 30 cm, still more preferably at least 40 cm, and still more preferably at least 50 cm. The at least one guide device 21 of the at least one sensor device 13 preferably comprises at least two rails 24; 26, which define the sensor adjustment path. These rails 24; 26 are preferably arranged so as to be stationary with respect to and/or on the frame side walls 04; 06 of the frame 03 of the machine 01. In the first backed-away position thereof, the at least one sensor device 13 can preferably be accessed for cleaning and/or removed from the machine 01.

For example, the sensor adjustment path is at least partly curved and/or the at least one sensor device 13, in the first backed-away position thereof, points in a different direction. Preferably, at least one in particular first holding element 19 is arranged in such a way that, when the sensor device 13 is arranged in the inspection position, it is necessary to switch a device and/or overcome a holding force to be able to move the sensor device 13 out of this inspection position. For example, at least one in particular second holding element is arranged in such a way that, when the sensor device 13 is arranged in the first backed-away position, it is necessary to switch a device and/or overcome a holding force to be able to move the sensor device 13 out of this first backed-away position.

Preferably, at least one connecting line of the at least one sensor device 13 is arranged so as to allow a movement of the at least one sensor device 13 between the inspection position and the first backed-away position, while a line connection ensured by this particular connecting line is preserved. More preferably, all connecting lines of the at least one sensor device 13 are arranged so as to allow a movement of the at least one sensor device 13 between the inspection position and the first backed-away position, while a line connection ensured by this particular connecting line is preserved.

The at least one first illumination device 14 can preferably be arranged so as to be pivotable about a first pivot axis 17, in particular for changing between different illumination positions. The at least one first illumination device 14 can preferably be arranged so as to be pivotable about the first pivot axis 17 in different illumination positions. The first illumination device 14 is preferably arranged so as to be pivotable about the first pivot axis 17 independently of the at least one sensor device 13. This first pivot axis 17 is preferably oriented parallel to the transverse direction A. The first pivot axis 17 is preferably arranged in such a way that the first pivot axis 17 intersects the inspection region 12 or has a smallest distance with respect to the inspection region 12, which is no more than 20 mm, more preferably no more than 10 mm, and still more preferably no more than 5 mm. The at least one first illumination device 14 is preferably arranged so as to be pivotable about the first pivot axis 17 in a first angular range delimited by two end positions. This first angular range W preferably extends over at least 5°, more preferably at least 8°, and still more preferably at least 10°. Preferably, at least one pivot guide device 18 is provided, which defines a corresponding pivot path for pivoting movements of the at least one first illumination device 14. The at least one pivot guide device 18 has, for example, rail elements and/or elongated holes which define corresponding circular arcs for guide elements. As an alternative or in addition, the at least one pivot guide device 18 comprises guide elements, for example, which are provided for guiding accordingly movable components by way of rail elements and/or elongated holes situated therein.

The at least one first illumination device 14 is preferably designed as a device for emitting electromagnetic radiation in the visible range, in particular for emitting white light in the visible range. As an alternative or in addition, the at least one first illumination device 14 is designed as a device for emitting electromagnetic radiation in the infrared range. As an alternative or in addition, the at least one first illumination device 14 is designed as a device for emitting electromagnetic radiation in the ultraviolet range. The at least one first illumination device 14 is preferably designed to be switchable so as to selectively emit electromagnetic radiation in the visible range and/or electromagnetic radiation in the infrared range and/or electromagnetic radiation in the ultraviolet range.

The at least one first illumination device 14 is preferably designed to illuminate the inspection region 12 with at least predominantly directed light. Preferably, thus more than 50%, furthermore at least 75%, and still more preferably at least 90% of the light intensity stemming from the at least one first illumination device 14 and incident on the inspection region 12 is directed light.

The at least one inspection device 08; 768 preferably comprises at least one second illumination device 16, which is arranged so as to be aligned with the inspection region 12. This at least one second illumination device 16 is preferably designed to illuminate the inspection region 12 with at least predominantly diffuse light. Preferably, thus more than 50%, furthermore at least 75%, and still more preferably at least 90% of the light intensity stemming from the at least one second illumination device 16 and incident on the inspection region 12 is diffuse light. The at least one second illumination device 16 is preferably designed as a device for emitting electromagnetic radiation in the visible range, in particular for emitting white light in the visible range. As an alternative or in addition, the at least one second illumination device 16 is designed as a device for emitting electromagnetic radiation in the infrared range. As an alternative or in addition, the at least one second illumination device 16 is designed as a device for emitting electromagnetic radiation in the ultraviolet range. The at least one second illumination device 16 is preferably designed to be switchable so as to selectively emit electromagnetic radiation in the visible range and/or electromagnetic radiation in the infrared range and/or electromagnetic radiation in the ultraviolet range.

In the working position, the inspection device 08; 768 is preferably arranged between the at least one first illumination device 14 assigned thereto and the at least one second illumination device 16 assigned thereto. In particular, at least one rectilinear connecting line from the first illumination device 14 to the second illumination device 16 intersects the inspection device 08; 768.

Preferably, a backing-away guide device 22 of the first illumination device 14 is provided, which defines an adjustment path of the first illumination device 14 along which the at least one first illumination device 14 can be moved between at least one illumination position of the at least one first illumination device 14 and at least one maintenance position of the at least one first illumination device 14. This adjustment path of the first illumination device 14 is preferably linear and/or preferably extends parallel to the transverse direction A. The respective illumination position of the at least one first illumination device 14 and the maintenance position of the at least one first illumination device 14 preferably differ in the positioning thereof relative to the transverse direction A, in particular by a length that at least corresponds to the working width of the machine 01 and/or at least the clear width W of the machine 01, in particular at least a sum of the clear width W and a dimension of a frame side wall 04; 06 of the frame 03 of the machine 01 in the transverse direction A. The backing-away guide device 22 of the first illumination device 14 comprises a rail and multiple roller elements, for example. The at least one backing-away guide device 22, together with the first illumination device 14, is preferably arranged so as to be pivotable about the first pivot axis 17, in particular in a manner guided by the at least one pivot guide device 18.

Preferably, a backing-away guide device 23 of the second illumination device 16 is provided, which defines an adjustment path of the second illumination device 16 along which the at least one second illumination device 16 can be moved between at least one illumination position of the at least one second illumination device 16 and at least one maintenance position of the at least one second illumination device 16. This adjustment path of the second illumination device 16 is preferably linear and/or preferably extends parallel to the transverse direction A. The illumination position of the at least one second illumination device 16 and the maintenance position of the at least one second illumination device 16 preferably differ in the positioning thereof relative to the transverse direction A, in particular by a length that at least corresponds to the working width of the machine 01 and/or at least the clear width W of the machine 01, in particular at least a sum of the clear width W and a dimension of a frame side wall 04; 06 of the frame 03 of the machine 01 in the transverse direction A. The backing-away device 23 of the second illumination device 16 comprises a rail and multiple roller elements, for example.

The machine 01 comprises, for example, at least two such inspection devices 08; 768. For example, a first inspection device 08; 768 for inspecting a first side of a respective sheet is provided, and a second inspection device 08; 768 for inspecting a second side of the respective sheet located opposite the first side of the respective sheet is provided. These are in particular a front side and a rear side of a respective sheet. The two inspection devices 08; 768 then cooperate, for example, with different sheet transport means 07; 708; 709; 711; 712; 713; 714, which however are preferably identically designed, for example each as a suction drum 713.

In one embodiment, the at least one inspection device 08; 768 is integrated into a device of the machine 01, for example into a module, in particular a screen printing unit 700. In an alternative or additional refinement, the machine 01 comprises a separate inspection device, which, for example, is designed as a separate module and/or can be used at different points of a modular machine 01.

The machine 01 comprises, for example, at least one sheet processing unit 200; 500; 600; 700. For example, the machine 01 comprises at least two or even more sheet processing units 200; 500; 600; 700. The at least one sheet processing unit 200; 500; 600; 700 is preferably at least also designed as a sheet-fed printing unit 200; 500; 600; 700. A sheet-fed printing unit 200; 500; 600; 700 shall possibly also, generally speaking, be understood to mean a sheet coating unit 200; 500; 600; 700, that is, in particular also a sheet varnishing unit 200; 500; 600; 700. The sheet-fed printing machine 01 comprises, for example, several printing units 200; 500; 600; 700, which are assigned to different printing methods.

The machine 01 preferably comprises at least one screen printing unit 700 designed as a sheet-fed printing unit 700. As a result of the screen printing method, a particularly large film thickness can be applied. The screen printing unit 700 is used in particular for generating optically variable image elements, in particular security elements, on the sheets. The screen printing unit 700 preferably comprises at least one impression cylinder 708 and a screen printing forme cylinder 752 cooperating therewith. Together, the two form a respective screen printing nip. In this way, coating medium, in particular printing ink, can be applied in the customary manner onto sheets. Preferably, at least one optically variable coating medium is employed, in particular at least one optically variable printing ink and/or at least one optically variable varnish. This optically variable coating medium is applied, for example, across the entire surface area or preferably in partial regions in the form of first print image elements. The machine 01, and preferably the screen printing unit 700, preferably comprises at least one alignment device 771 for aligning particles which are contained in the optically variable coating medium applied onto the particular sheet and which are responsible for the optical variability. Particles responsible for the optical variability that are preferably contained in the particular coating medium, in particular in the printing ink or in the varnish, are magnetic or magnetizable, non-spherical particles, for example, pigment particles, here also referred to as magnetic particles or flakes for short. The at least one alignment device 771 preferably comprises multiple components. The alignment device 709 and preferably the screen printing unit 700 preferably comprises at least one alignment cylinder 709. This at least one alignment cylinder 709 is preferably part of a respective alignment device 771. The alignment device 771 thus preferably comprises at least one alignment cylinder 709, which is in particular designed as a rotational transport body 709 and/or designed as a magnetically active alignment cylinder 709. The screen printing unit 700 preferably comprises at least one pre-alignment device 767. This at least one pre-alignment device 767 is preferably part of a respective alignment device 771.

The screen printing unit 700 preferably comprises at least one drying device 772. The term drying device 772 shall also be understood to mean a curing device 772. The at least one respective drying device 772 can be considered to be part of a respective alignment device 771, in particular since it is used for fixing the alignment. The at least one drying device 772 is preferably arranged on the transport path provided for the transport of sheets downstream from, or more preferably in the region of, the alignment cylinder 709. The at least one drying device 772 is preferably designed as an in particular narrow-band radiation dryer 772, for example as a UV dryer 772, in particular LED dryer 772, and more preferably UV LED dryer 772. This dryer is preferably arranged along the transport path provided for the transport of sheets so as to be directed, in the direction of an outer cylindrical surface of the respective alignment cylinder 709, at the transport angle thereof, over which the sheets are conveyed by means of the alignment cylinder 709.

Such a transport angle shall be understood to mean the angular range around the respective axis of rotation of the respective rotational transport body 708; 709; 711; 712; 713; 714 in which sheets are transported by means of this rotational transport body 708; 709; 711; 712; 713; 714, and in particular are transported while being held by the same. So as to avoid unnecessary heating, the drying device 772 preferably operates in a narrow-band wavelength range that favors curing, for example in a wavelength band having a spectral full width at half maximum, based on the radiant power, of no more than 50 nm, and preferably no more than 30 nm. The maximum radiation preferably has a wavelength of 385±25 nm, and in particular 385±15 nm.

In a likewise advantageous refinement of the printing press 01, a drying and/or curing device 906 that is effective over the entire substrate width, for example a radiation dryer 906, in particular a UV dryer 906, is provided downstream from a last alignment device 771 for thoroughly drying the coating medium applied onto the sheets. This drying and/or curing device 906 is preferably designed as a narrow-band radiation dryer 906.

The machine 01 preferably comprises an in particular stationary frame 03, which has at least two in particular stationary frame side walls 04; 06. For example, the screen printing unit 700 comprises an in particular stationary frame 701, which has at least two in particular stationary frame side walls 702; 703. The frame 701 of the screen printing unit 700 is then, for example, part of the frame of the machine 01. The frame side walls 702; 703 of the screen printing unit 700 are then, for example, parts of the frame side walls of the machine 01. The screen printing unit 700 can be configured, for example, in a variety of embodiments. These embodiments preferably have in common that the respective screen printing unit 700 in each case comprises at least one, in particular stationary, base module 704. The frame side walls of the machine 01 are arranged opposite one another, in particular opposite in the transverse direction A. The frame side walls 702; 703 of the screen printing unit 700 are preferably arranged opposite one another, in particular opposite in the transverse direction A.

Four installation areas for rotational transport bodies 708; 709; 711; 712; 713; 714 are in each case defined by the respective base module 704. A rotational transport body 708; 709; 711; 712; 713; 714 shall be understood to mean an assembly 708; 709; 711; 712; 713; 714 that is arranged rotatably about a respective axis of rotation and is used to transport sheets. Examples of rotational transport bodies 708; 709; 711; 712; 713; 714 are impression cylinders 708, alignment cylinders 709, transfer drums 711, blower drums 712, suction drums 713 and sprocket wheel shafts 714. Another example of a rotational transport body 102 is a receiving drum 102. The receiving drum 102, however, is preferably part of the sheet feed device 100.

The screen printing unit 700 is designed for printing sheets by means of at least one printing forme that is preferably designed as a cylindrical screen, in particular a screen printing forme. This printing forme preferably comprises a multiplicity of, in particular like and/or identical, image-producing elements, for example, print image motifs, or, in particular like and/or identical, groups of image-producing print motifs around the circumference which, on a circumferential length corresponding to the print image length, are arranged, for example, in a matrix-like manner in several columns, which are equidistantly spaced apart from one another transversely to the transport direction T, and on a cylinder width corresponding to the print image width are arranged in several rows, which are equidistantly spaced apart from one another in the transport direction T. These elements or print motifs are preferably designed in the form of screen printing stencils. The screen printing unit 700 preferably comprises at least one screen printing forme cylinder 752. Preferably, a dedicated impression cylinder 708 is assigned to each screen printing cylinder 752. A respective screen printing forme cylinder 752 carries such a cylindrical screen and/or comprises such a cylindrical screen. The impression cylinder 708 and the screen printing forme cylinder 752 together form a screen printing nip.

The machine 01 and in particular the screen printing unit 700 comprises at least one transfer drum 711, for example. A respective transfer drum 711 conventionally comprises at least one gripper device for conveying the sheets. The respective transfer drum 711 preferably comprises at least one main body. The at least one gripper device comprises fixing elements for receiving and fixing the sheets. The fixing elements are preferably movably arranged at the main body and/or movable jointly therewith. Preferably, grippers, in particular clamping and/or suction grippers for gripping the sheet edges, are provided as fixing elements. The respective transfer drum 711, and in particular the main body thereof and/or the at least one gripper device thereof, are arranged so as to be rotatable about an axis of rotation. The transfer drum 711, for example, but not necessarily, comprises a supporting surface for sheets.

The machine 01 and in particular the screen printing unit 700 comprises at least one blower drum 712, for example. A respective blower drum 712 conventionally comprises at least one gripper device for conveying the sheets. The respective blower drum 712 preferably comprises at least one main body. The at least one gripper device comprises fixing elements for receiving and fixing the sheets. The fixing elements are preferably movably arranged at the main body and/or movable jointly therewith. Preferably, grippers, in particular clamping and/or suction grippers for gripping the sheet edges, are provided as fixing elements. The respective blower drum 712, and in particular the at least one gripper device thereof and/or the main body thereof, are arranged so as to be rotatable about an axis of rotation. The respective blower drum 712 preferably does not include a rotatable supporting surface for sheets. Preferably, at least one sheet guide device and at least one sheet blower device are provided. The at least one sheet guide device preferably has at least one inner surface, the shape of which corresponds to a section of a cylinder shell having an axis that is identical to the axis of rotation of the blower drum 712. The at least one sheet blower device is used to generate a flow of gas that is directed from the inside against the inner surface of this sheet guide device. In this way, the corresponding sheet, while being held by the gripper device, can be transported onward about the axis of rotation, while the inwardly directed side thereof, apart from the contact surfaces of the fixing elements, does not come in contact with parts of the machine 01, in particular the screen printing unit 700.

The respective blower drum 712 is preferably arranged, along the transport path provided for the transport of sheets, directly downstream from a respective impression cylinder 708, and more preferably also directly upstream from a respective alignment cylinder 709. Sheets can thus be transported from the impression cylinder 708 to the alignment cylinder 709, without a freshly printed sheet surface coming in contact with an object and the applied print image possibly becoming damaged.

Preferably, at least one pre-alignment device 767 is arranged in the region of the blower drum 712. This at least one pre-alignment device 767 is preferably part of a respective alignment device 771. This at least one pre-alignment device 767 is preferably arranged so as to be stationary. This at least one pre-alignment device 767 is preferably assigned to a respective blower drum 712, which more preferably is assigned to a respective downstream alignment cylinder 709. The pre-alignment device 767 is preferably designed so as to extend over an exposure angle about the axis of rotation of the blower drum 712. The pre-alignment device 767 preferably comprises at least one, and more preferably several solenoids and/or permanent magnets.

The machine 01 and in particular the screen printing unit 700 comprises at least one suction drum 713, for example. A respective suction drum 713 conventionally comprises at least one gripper device for conveying the sheets. The respective suction drum 713 preferably comprises at least one main body. The at least one gripper device comprises fixing elements for receiving and fixing the sheets. The fixing elements are preferably movably arranged at the main body and/or movable jointly therewith. Preferably, grippers, in particular clamping and/or suction grippers for gripping the sheet edges, are provided as fixing elements. The respective suction drum 713, and in particular the main body thereof and/or the at least one gripper device thereof, are rotatably arranged about an axis of rotation. The suction drum 713 preferably comprises a supporting surface for sheets. The at least one gripper preferably comprises at least one movable gripper finger, which is arranged so as to be movable relative to a main body of the suction drum 713 and/or the supporting surface of the suction drum 713. The supporting surface of the suction drum 713 preferably has suction openings, in particular for taking in ambient air and/or applying suction to sheets. When a sheet is arranged on the supporting surface of the suction drum 713, the leading edge thereof is preferably held by grippers. As an alternative or in addition, the sheet is only held by the suction openings on the supporting surface.

The machine 01 comprises a sprocket wheel shaft 714, for example. For example, the screen printing unit 700 comprises a sprocket wheel shaft 714. This is in particular relevant when the sheet delivery 900 follows directly downstream from the screen printing unit 700 along the transport path provided for the transport of sheets. The sprocket wheel shaft 714 is used in particular for diverting a traction means, designed in particular as a chain, of a chain conveyor system 904 or chain gripper system 904.

As described, the screen printing unit 700 preferably comprises at least one alignment cylinder 709, which is in particular designed as a rotational transport body 709. The respective alignment cylinder 709 is preferably designed as a magnetically active alignment cylinder 709. Preferably, sheets are transported by means of the respective alignment cylinder 709, and in the process the magnetic particles of the coating medium that was previously applied and has not yet dried are oriented in keeping with a pattern of magnetic field lines proceeding from the respective alignment cylinder 709. In the region of the outer circumference, the respective alignment cylinder 709 preferably comprises a plurality of elements inducing a magnetic field, magnetic elements for short, which are used, in particular, to orient at least some of the magnetic or magnetizable particles of the coating medium that is applied to the respective passing sheet. The magnetic elements can be formed by permanent magnets with or without engraving, by solenoids, or by combinations of one or more permanent magnets and/or one or more solenoids. These can be removable and/or rotatable about a radially extending axis and/or be arranged on a cylinder main body so as to be adjustable, individually or in groups, with respect to the axial and/or circumferential positions thereof, and together therewith can form the respective alignment cylinder 709. For the case of the aforementioned plurality of multiple-up copies per sheet, several, for example, at least four, rows of in each case several, for example, three to eight, in particular four to seven, magnetic elements that are spaced apart from one another transversely to the transport direction T, are provided or can be provided around the circumference, for example, in a matrix-like manner. By conveying the sheets over the respective alignment cylinder 709, the particles are aligned or oriented by means of the magnetic field lines caused by the magnetic elements, possibly also through the particular sheet.

The magnetic elements can be arranged or arrangeable in or at several, for example, three to eight, in particular in four to seven, ring elements that can be axially spaced apart from one another and preferably be positioned in the axial direction A, wherein in or at these ring elements, in turn, in each case at least one, preferably several, for example, between two and twelve, advantageously between five and ten, magnetic elements are arranged or can be arranged one behind the other in the circumferential direction and preferably positionable in the circumferential direction. For example, the at least one alignment cylinder 709 comprises at least one suction device, by means of which a respective sheet can be held on the alignment cylinder 709.

The respective alignment cylinder 709 is preferably mounted between frame side walls, in particular frame side walls 702; 703 of the screen printing unit 700, so as to be removable, in particular without removing one of the frame side walls, for a replacement or for carrying out makeready work. This, however, shall be understood to mean a "planned" or "routine" removal or reinsertion, different from a dismantling or disassembly of the relevant module. For this purpose, for example at least on the drive side, a rotationally fixed, detachable connection is provided between the alignment cylinder 709 or cylinder journal and a following drive shaft, the disconnection point of which is situated within the clear width W between the frame side walls 702; 703.

Preferably, at least one outer magnetic device 774 is provided, which is in particular designed as a simultaneous magnetic device 774. This at least one outer magnetic device 774 is preferably arranged so as to be stationary at least during printing. This at least one outer magnetic device 774 is preferably assigned to a respective alignment cylinder 709. This at least one outer magnetic device 774 is preferably part of an alignment device 771, in particular the alignment device 771 of which the assigned alignment cylinder 709 is also part. The outer magnetic device 774 is preferably designed so as to extend over an exposure angle around the assigned alignment cylinder 709. The outer magnetic device 774 preferably comprises at least one, and more preferably several solenoids and/or permanent magnets and preferably cooperates with the magnetic devices of the respective alignment cylinder 709.

The machine 01 preferably comprises two frame side walls 04; 06 of a respective frame 03. These two frame side walls 04; 06 preferably each define one of two inner wall planes W1; W2, by which more preferably a clear width W of the respective frame 03 is defined.

For example, as an alternative or in addition to a described screen printing unit 700, a machine 01 designed as a sheet-fed printing machine 01 comprises at least one in particular further printing unit 200; 500; 600, which is designed as a sheet simultaneous printing unit 200 and/or which is designed as a sheet numbering printing unit 500 and/or which is designed as a flexographic printing unit 600, in particular sheet flexographic printing unit 600 and/or as a sheet varnishing unit.

Hereafter, initially exemplary embodiments of printing machines 01 will be described by way of example, which preferably comprise at least one inspection device 768 and at least one screen printing unit 700. A substrate feed device 100 designed as a sheet feeder 100 is in each case arranged upstream from the respective screen printing unit 700, and a sheet delivery 900 designed as a multiple pile delivery unit 900 is arranged downstream therefrom. The respective printing machines 01 can be modified so as to additionally or alternatively comprise other and/or further sheet processing units 200; 500; 600 between the sheet feeder 100 and the sheet delivery 900.

A first exemplary embodiment of such a printing machine 01 comprises a screen printing unit 700 including three base modules 704 that abut one another. The first base module 704 along the transport path provided for the transport of sheets comprises an in particular first impression cylinder 708 in the first installation area thereof, an in particular first blower drum 712 in the second installation area thereof, an in particular first alignment cylinder 709 in the third installation area thereof and an in particular first transfer drum 711 in the fourth installation area thereof. The second base module 704 along the transport path provided for the transport of sheets comprises an in particular second impression cylinder 708 in the first installation area thereof, an in particular second blower drum 712 in the second installation area thereof, an in particular second alignment cylinder 709 in the third installation area thereof and an in particular second transfer drum 711 in the fourth installation area thereof. The third base module 704 along the transport path provided for the transport of sheets comprises an in particular third transfer drum 711 in the first installation area thereof, an in particular third impression cylinder 708 in the second installation area thereof, an in particular third blower drum 712 in the third installation area thereof and an in particular third alignment cylinder 709 in the fourth installation area thereof. Subsequent thereto, an in particular first suction drum 713, an in particular second suction drum 713, an in particular fourth transfer drum 711 and a sprocket wheel shaft 714 are consecutively arranged in one or more intermediate frames 738.

Figure 4:
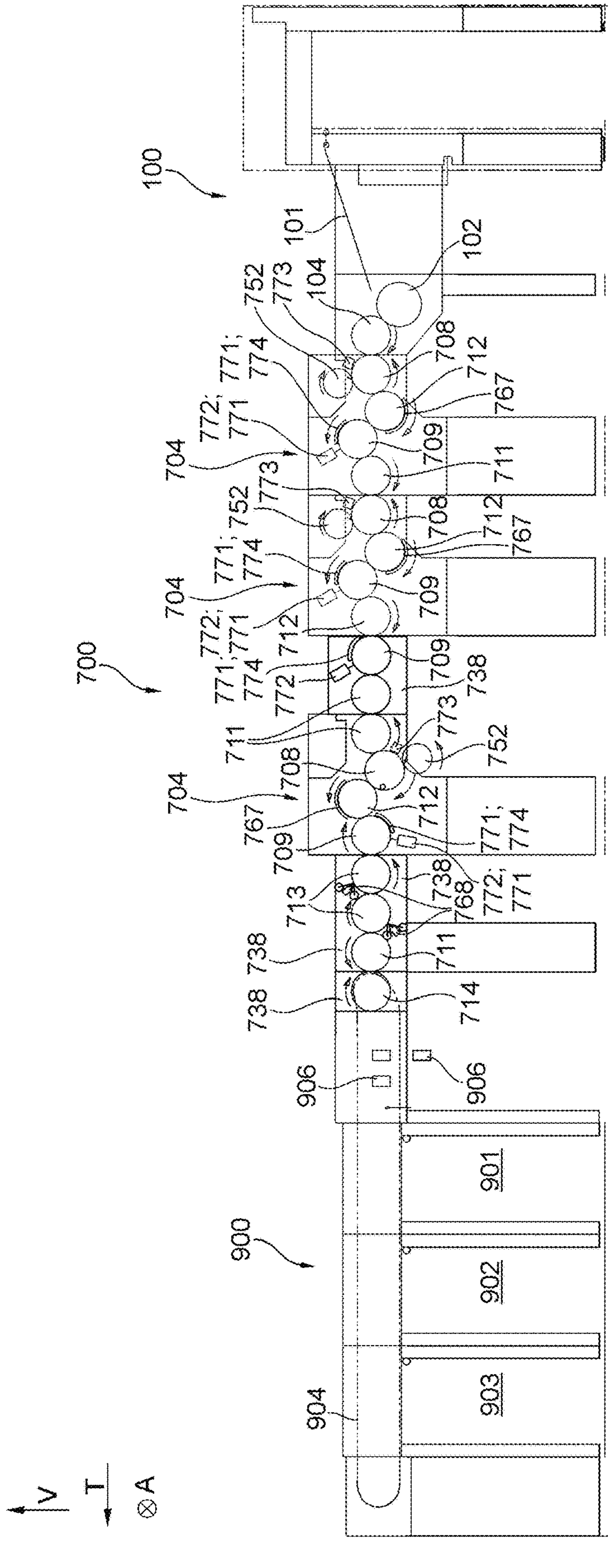
FIG. 4 a schematic representation of a first embodiment of a sheet-fed printing machine comprising a screen printing unit including three base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, a respective inspection device 768 is arranged so as to cooperate with each suction drum 713. This first exemplary embodiment of a screen printing unit 700 allows a first printing of a front side of sheets, a subsequent alignment of particles applied in the process, a subsequent second printing of the front side of the sheets, a subsequent alignment of particles applied in the process, a first printing of a rear side of the sheets, a subsequent alignment of particles applied in the process and a subsequent inspection of the front side and the rear side of the sheets. A sheet feeder 100 is arranged upstream from the screen printing unit 700, for example, in particular in such a way that a rotational transport body 104 assigned thereto, together with the impression cylinder 708 of the first base module 704, forms the first transfer point thereof. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing machine comprising such a screen printing unit 700 is shown schematically in FIG. 4 by way of example.)

A second exemplary embodiment of such a printing machine 01 comprises a screen printing unit 700 including two base modules 704 that abut one another. The first base module 704 along the transport path provided for the transport of sheets comprises an in particular first impression cylinder 708 in the first installation area thereof, an in particular first blower drum 712 in the second installation area thereof, an in particular first alignment cylinder 709 in the third installation area thereof and an in particular first transfer drum 711 in the fourth installation area thereof. The second base module 704 along the transport path provided for the transport of sheets comprises an in particular second transfer drum 711 in the first installation area thereof, an in particular second impression cylinder 708 in the second installation area thereof, an in particular second blower drum 712 in the third installation area thereof and an in particular second alignment cylinder 709 in the fourth installation area thereof. Subsequent thereto, an in particular first suction drum 713, an in particular second suction drum 713, an in particular third transfer drum 711 and a sprocket wheel shaft 714 are consecutively arranged in one or more intermediate frames 738.

Figure 5:
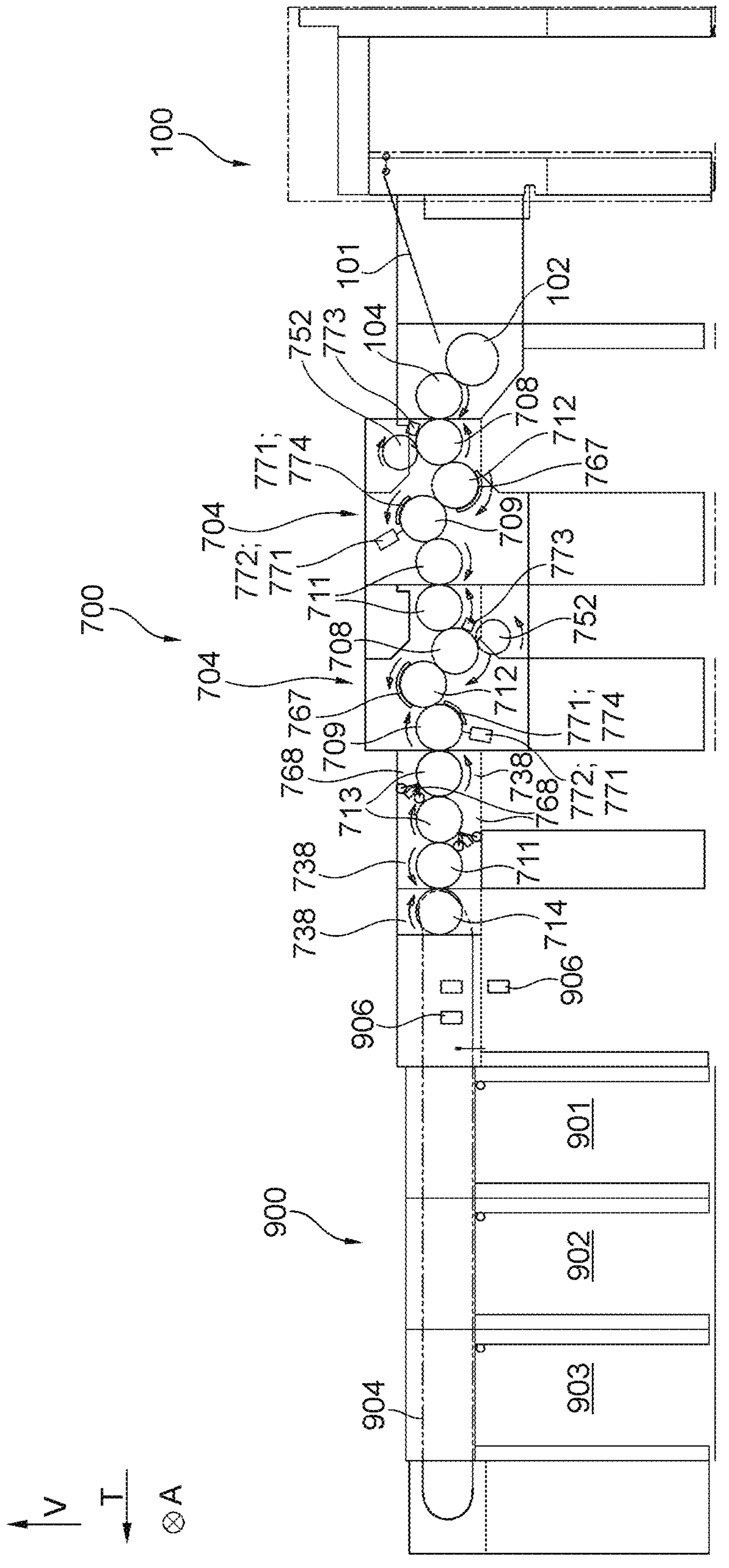
FIG. 5 a schematic representation of a second embodiment of a sheet-fed printing machine comprising a screen printing unit including two base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, a respective inspection device 768 is arranged so as to cooperate with each suction drum 713. This second exemplary embodiment of a screen printing unit 700 allows a printing of a front side of sheets, a subsequent alignment of particles applied in the process, a printing of a rear side of the sheets, a subsequent alignment of particles applied in the process and a subsequent inspection of the front side and the rear side of the sheets. A sheet feeder 100 is arranged upstream from the screen printing unit 700, for example, in particular in such a way that a rotational transport body 104 assigned thereto, together with the impression cylinder 708 of the first base module 704, forms the first transfer point thereof. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing machine comprising such a screen printing unit 700 is shown schematically in FIG. 5 by way of example.)

Figure 6:
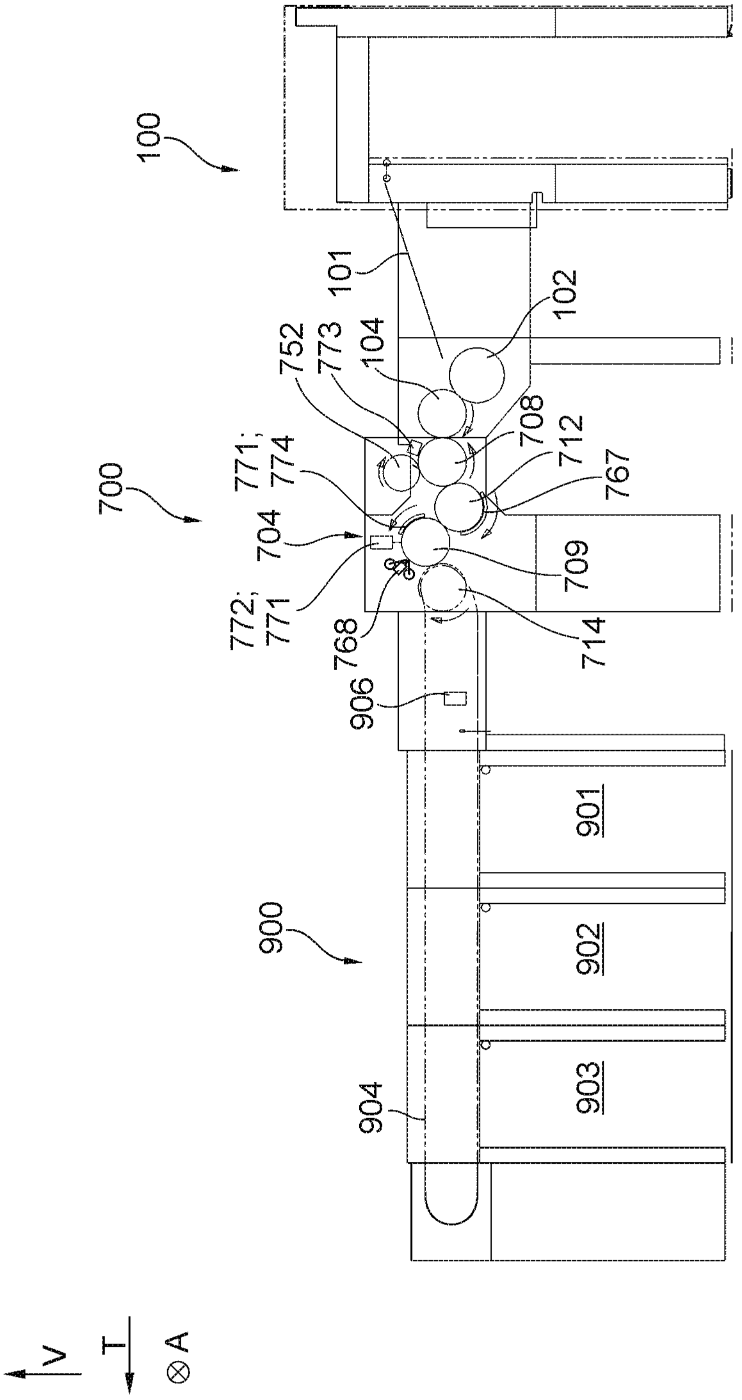
FIG. 6 a schematic representation of a third embodiment of a sheet-fed printing machine comprising a screen printing unit including one base module.
Figure 7:
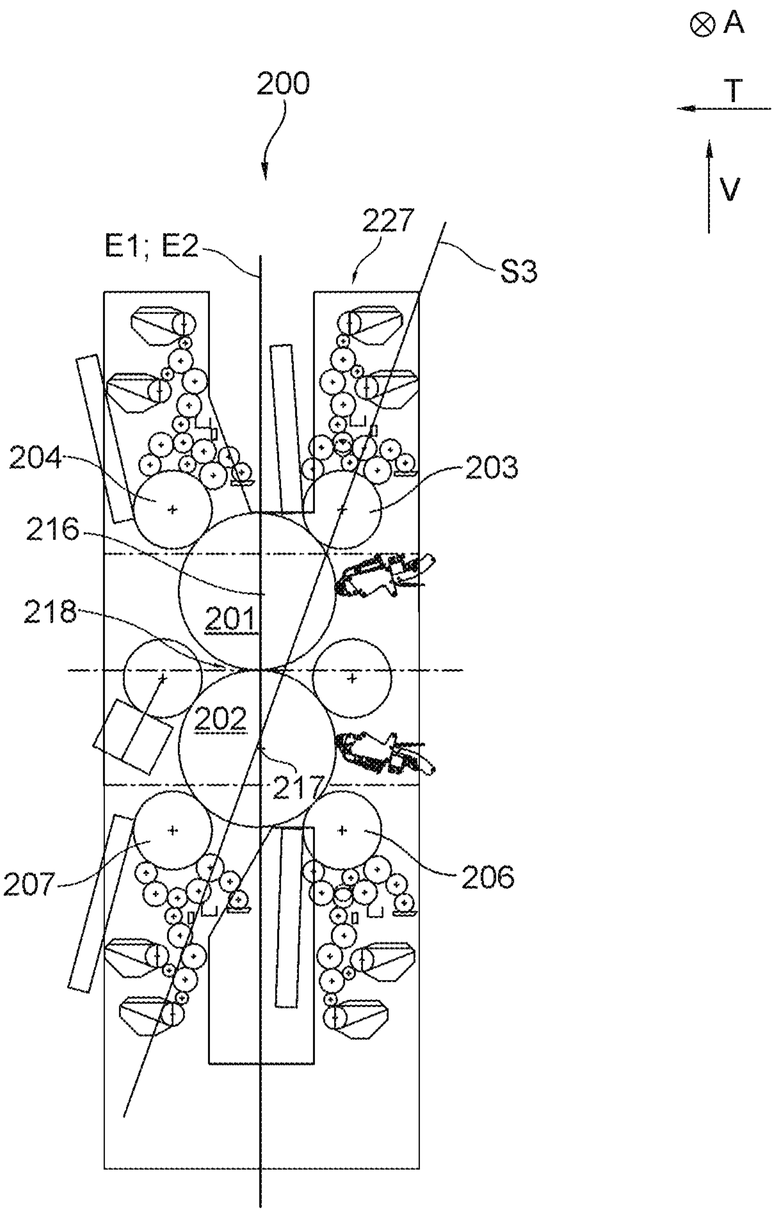
FIG. 7 a schematic representation of a simultaneous double printing unit.
Figure 9:
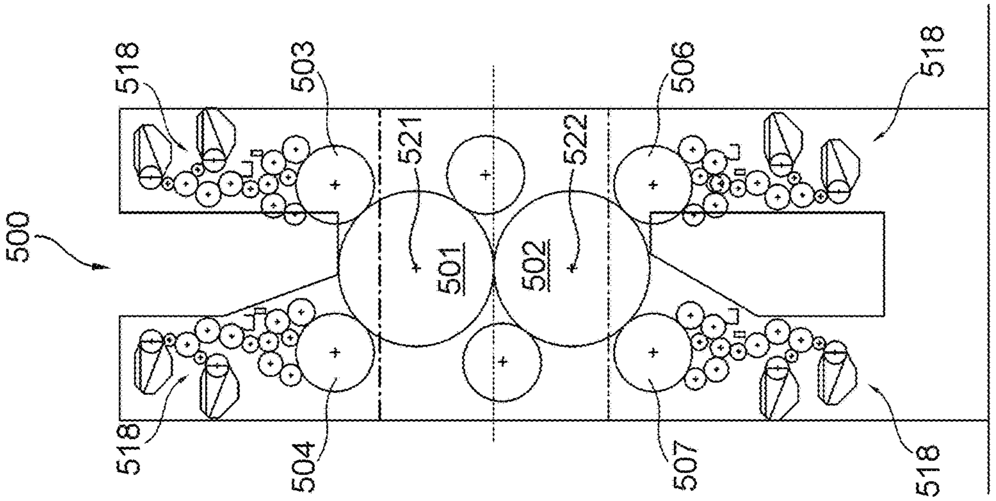
FIG. 9 a schematic representation of a sheet numbering printing unit.
Figure 8:
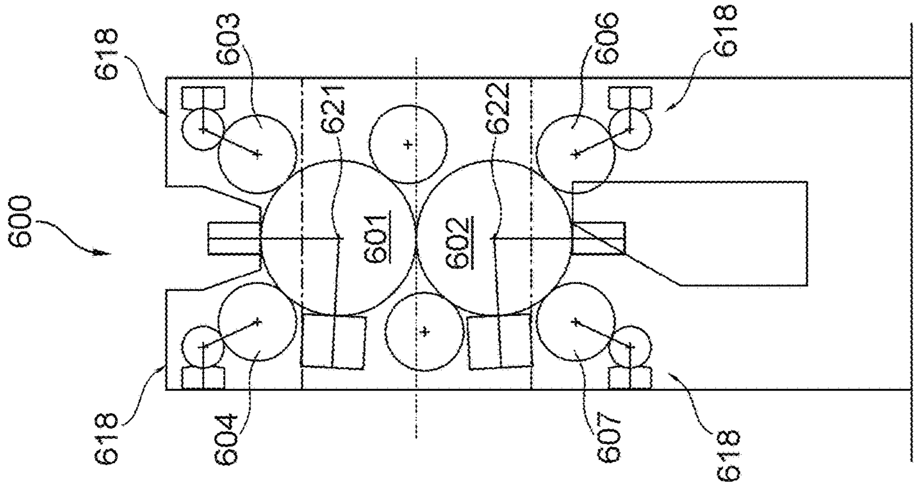
FIG. 8 a schematic representation of a flexographic printing unit.

A third exemplary embodiment of such a printing machine 01 comprises a screen printing unit 700 including one base module 704. The base module 704 comprises an impression cylinder 708 in the first installation area thereof, a blower drum 712 in the second installation area thereof, an in particular first alignment cylinder 709 in the third installation area thereof, and a sprocket wheel shaft 714 in the fourth installation area thereof. The alignment cylinder 709 preferably comprises suction devices. Preferably, a screen printing forme cylinder 752 is arranged so as to cooperate with the impression cylinder 708. A pre-alignment device 767 is preferably arranged so as to cooperate with the blower drum 712. A drying device 772 or curing device 772 and/or an outer magnetic device 774 as well as an inspection device 768 are preferably arranged so as to cooperate with the alignment cylinder 709. This third exemplary embodiment of a screen printing unit 700 allows a printing of a front side of sheets, a subsequent alignment of particles applied in the process, and a subsequent inspection of the front side of the sheets. It preferably offers the same functionality as the eighth exemplary embodiment, however it has a lower space requirement. A sheet feeder 100 is arranged upstream from the screen printing unit 700, for example, in particular in such a way that a rotational transport body 104 assigned thereto, together with the impression cylinder 708 of the first base module 704, forms the first transfer point thereof. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing machine comprising such a screen printing unit 700 is shown schematically in FIG. 6 by way of example.)

In an additional or alternative refinement, the sheet processing machine 01 preferably additionally comprises at least one further printing unit 200; 500; 600, which more preferably is designed as a sheet simultaneous printing unit 200 and/or which is designed as a sheet numbering printing unit 500 and/or which is designed as a flexographic printing unit 600.

In an additional or alternative refinement or configuration, the sheet processing machine 01 preferably comprises at least one sheet-fed printing unit 200 designed for a simultaneous printing process. Such a sheet-fed printing unit 200 is also referred to as a sheet simultaneous printing unit 200 or sheet collect printing unit 200. The simultaneous printing process is in particular characterized in that printing ink stemming from different forme cylinders 203; 204; 206; 207 is first collected on a collect cylinder 201; 202, which is preferably designed as a transfer cylinder 201; 202, and is then transferred concomitantly, that is, simultaneously, onto a respective sheet. This transfer preferably takes place directly from the collect cylinder 202, which is then preferably also designed as a transfer cylinder 201; 202. The respective transfer cylinder 201; 202 preferably cooperates with a respective impression cylinder 201; 202. Preferably, in each case a transfer cylinder 201; 202 and an impression cylinder 201; 202 together form a printing nip 218, wherein the sheets are preferably transported through this printing nip 218 and/or wherein the sheets are preferably provided with printing ink in this printing nip 218, in particular with the collected printing inks. Preferably, two cylinders 201; 202 cooperate in such a way that each is designed as a transfer cylinder 201; 202 and at the same time acts as an impression cylinder 201; 202 for the respective other of these two cylinders 201; 202. The sheet simultaneous printing unit 200 is then, for example, also referred to as a simultaneous double printing unit 200 and is used, in particular, for simultaneously printing a respective sheet on two sides. Preferably, only one of these collect cylinders 201; 202 is designed as a sheet transport cylinder 201; 202.

The at least one sheet simultaneous printing unit 200 comprises at least two forme cylinders 203; 204; 206; 207. Each respective forme cylinder 203; 204; 206; 207 is preferably arranged so as to be directly in contact with a respective impression cylinder 201; 202 and/or so as to directly cooperate and/or be capable of directly cooperating therewith. The sheet simultaneous printing unit 200 preferably comprises four forme cylinders 203; 204; 206; 207, of which more preferably two are directly in contact with an in particular first shared collect cylinder 201; 202 and/or are arranged so as to directly cooperate and/or be capable of directly cooperating therewith, and of which more preferably two others are directly in contact with the other, in particular second shared collect cylinder 201; 202 and/or are arranged so as to directly cooperate and/or be capable of directly cooperating therewith.

Different printing forms, in particular printing plates, can be arranged on the respective forme cylinder 203; 204; 206; 207 of the sheet simultaneous printing unit 200, for example based on the print image to be printed. For example, at least one planographic printing forme can be arranged on the respective forme cylinder 203; 204; 206; 207. As an alternative or in addition, for example, at least one letterset printing forme can be arranged on the respective forme cylinder 203; 204; 206; 207.

A letterset printing forme has only a relatively low height of the ink-transferring areas compared to the remaining printing plate and, in terms of the operating principle thereof, is comparable to a letterpress forme. Preferably, at least one inking unit 227 is provided per forme cylinder 203; 204; 206; 207.

In an alternative or additional refinement, the sheet simultaneous printing unit 200 is preferably characterized by comprising a first collect cylinder 201 and a second collect cylinder 202, which are directly in contact with one another and/or are arranged so as to directly cooperate with one another, and which each have an axis of rotation 216; 217, and is characterized in that an axial plane E1 is a plane E1 that includes both the axis of rotation 216 of the first collect cylinder 201 and the axis of rotation 217 of the second collect cylinder 202, and that a reference plane E2 is a plane E2 that includes at least one axis of rotation 216; 217 of such a collect cylinder 201; 202 and has a horizontal surface normal. These two collect cylinders 201; 202 are preferably arranged, at least during a processing operation, in particular a printing operation, in such a way that the angle of intersection between the axial plane E1 on the one hand and the reference plane E2 on the other hand is no more than 45°, more preferably no more than 30°, still more preferably no more than 15°, still more preferably no more than 10°, still more preferably no more than 5°, still more preferably no more than 2°, still more preferably no more than 1°, still more preferably no more than 0.5°, and still more preferably exactly 0°.

The respective sheet simultaneous printing unit 200 preferably comprises exactly four forme cylinders 203; 204; 206; 207, of which exactly two are arranged so as to be directly in contact with and/or so as to directly cooperate with the first collect cylinder 201 and of which exactly two others are arranged so as to be directly in contact with and/or so as to directly cooperate with the second collect cylinder 202. Preferably, at least one inking unit 227 is provided per forme cylinder 203; 204; 206; 207, which has at least one respective ink reservoir 231, wherein least one reservoir cutting plane S3 is preferably defined for each ink reservoir 231, which both intersects this ink reservoir 231 and includes the axis of rotation 222; 223; 224; 226 of the forme cylinder 203; 204; 206; 207 which cooperates and/or is arranged so as to be capable of cooperating with the inking unit 227 that contains this ink reservoir 231, and wherein an angle of intersection between the reference plane E2 on the one hand and at least one such reservoir cutting plane S3 of the respective ink reservoir 231 on the other hand is preferably no more than 45°, more preferably no more than 35°, still more preferably no more than 25°, and still more preferably no more than 20°.

Preferred is a sheet-fed printing machine 01 that comprises at least one such sheet-fed printing unit 200 designed as a sheet simultaneous printing unit 200. This sheet-fed printing machine 01 preferably comprises at least one simultaneous printing inspection device 31, arranged downstream from the at least one sheet simultaneous printing unit 200, for inspecting sheets that are in particular printed by means of the at least one sheet simultaneous printing unit 200. A downstream simultaneous printing inspection device 31 shall in particular be understood to mean an inspection device 31 which is provided for inspecting the print image created by means of the at least one simultaneous printing unit 200. The sheet-fed printing machine 01 preferably comprises at least one sheet transport means 39, which is assigned to the simultaneous printing inspection device 31 and which defines a section 38 of a transport path 09 provided for a transport of sheets. This section 38 preferably comprises an inspection region 37 of the simultaneous printing inspection device 31. The simultaneous printing inspection device 31 preferably comprises at least one in particular optical sensor device 32, which in a simultaneous inspection position is preferably arranged so as to be directly aligned with the inspection region 37 of the simultaneous printing inspection device 31. This at least one sensor device 32 is preferably designed as a camera 32 and/or as a line scan camera 32. The sheet transport means 39 is preferably designed as a rotatable sheet transport means 39 and preferably forms a first transfer point 41 together with one of the collect cylinders 201; 202. More preferably, the sheet transport means 39 is designed as a suction drum 39 and forms a first transfer point 41 together with the collect cylinder 201; 202. The at least one sheet transport means 39 is preferably designed as a rotatable sheet transport means 39, the axis of rotation of which extends in the transverse direction A.

In an alternative or additional refinement, the sheet-fed printing machine 01 is preferably characterized in that at least one guide device 33 of the at least one sensor device 32 of the simultaneous printing inspection device 31 is provided, which defines a sensor adjustment path that is provided for a movement of the at least one sensor device 32 of the simultaneous printing inspection device 31 and that extends from the simultaneous inspection position at least to a backed-away position of the sensor device 32 of the simultaneous printing inspection device 31 which is designed as a maintenance position. This sensor adjustment path preferably extends linearly and parallel to the transverse direction A, more preferably exclusively linearly, at least between the simultaneous inspection position and the backed-away position of the sensor device 32 of the simultaneous printing inspection device 31 which is designed as a maintenance position. The at least one sensor device 32 preferably has a detection width which is at least 80% of the maximum working width.

In an alternative or additional refinement, the sheet-fed printing machine 01 is preferably characterized in that the inspection position of the sensor device 32 of the simultaneous printing inspection device 31 and the backed-away position, designed as the maintenance position, of the sensor device 32 of the simultaneous printing inspection device 31 differ in the positioning thereof relative to the transverse direction A, in particular by a length that corresponds at least to the working width of the sheet-fed printing machine 01 and/or at least to the clear width W of the sheet-fed printing machine 01, more preferably at least to a sum of the clear width W and a dimension of a frame side wall 04; 06 of the frame 03 of the sheet-fed printing machine 01 in the transverse direction A in the region of the sheet simultaneous printing unit 200. The guide device 33 of the at least one illumination device 32 of the simultaneous printing inspection device 31 has a rail and multiple roller elements, for example.

In an alternative or additional refinement, the sheet-fed printing machine 01 is preferably characterized in that the simultaneous printing inspection device 31 comprises at least one illumination device 34, which in an illumination position is preferably arranged so as to be directly aligned with the inspection region 37 of the simultaneous printing inspection device 31. Preferably, at least one backing-away guide device 36 of the at least one illumination device 34 of the simultaneous printing inspection device 31 is provided, which defines an illumination adjustment path that is provided for a movement of the at least one illumination device 34 of the simultaneous printing inspection device 31 and that extends from the illumination position at least to a backed-away position of the illumination device 34 of the simultaneous printing inspection device 31 which is designed as a maintenance position. The illumination adjustment path preferably extends linearly and parallel to the transverse direction A, more preferably exclusively linearly, at least between the illumination position and the backed-away position of the illumination device 34 of the simultaneous printing inspection device 31.

The illumination position of the at least one illumination device 34 of the simultaneous printing inspection device 31 and the maintenance position of the at least one illumination device 34 of the simultaneous printing inspection device 31 differ in the positioning thereof relative to the transverse direction A, in particular by a length that corresponds at least to the working width of the sheet-fed printing machine 01 and/or at least to the clear width W of the sheet-fed printing machine 01, more preferably at least to a sum of the clear width W and a dimension of a frame side wall 04; 06 of the frame 03 of the sheet-fed printing machine 01 in the transverse direction A in the region of the sheet simultaneous printing unit 200. The backing-away guide device 36 of the at least one illumination device 34 of the simultaneous printing inspection device 31 has a rail and multiple roller elements, for example.

The sheet-fed printing machine preferably comprises a further simultaneous printing inspection device 31 so as to inspect an opposite side of the sheets. This further simultaneous printing inspection device 31 is preferably composed analogously to the simultaneous printing inspection device 31 described above. A sheet transport means 39 of this further simultaneous printing inspection device 31 is preferably designed as a rotatable sheet transport means 39, and more preferably as a suction drum 39, and forms a second transfer point 42 together with the sheet transport means 39 of the above-described simultaneous printing inspection device 31.

The respective simultaneous printing inspection device 31 is preferably designed as a reflective inspection device 31. The respective assigned sheet transport means 39 is preferably designed as a rotational transport body 39 or as a corresponding assembly 39.

Figure 10A:
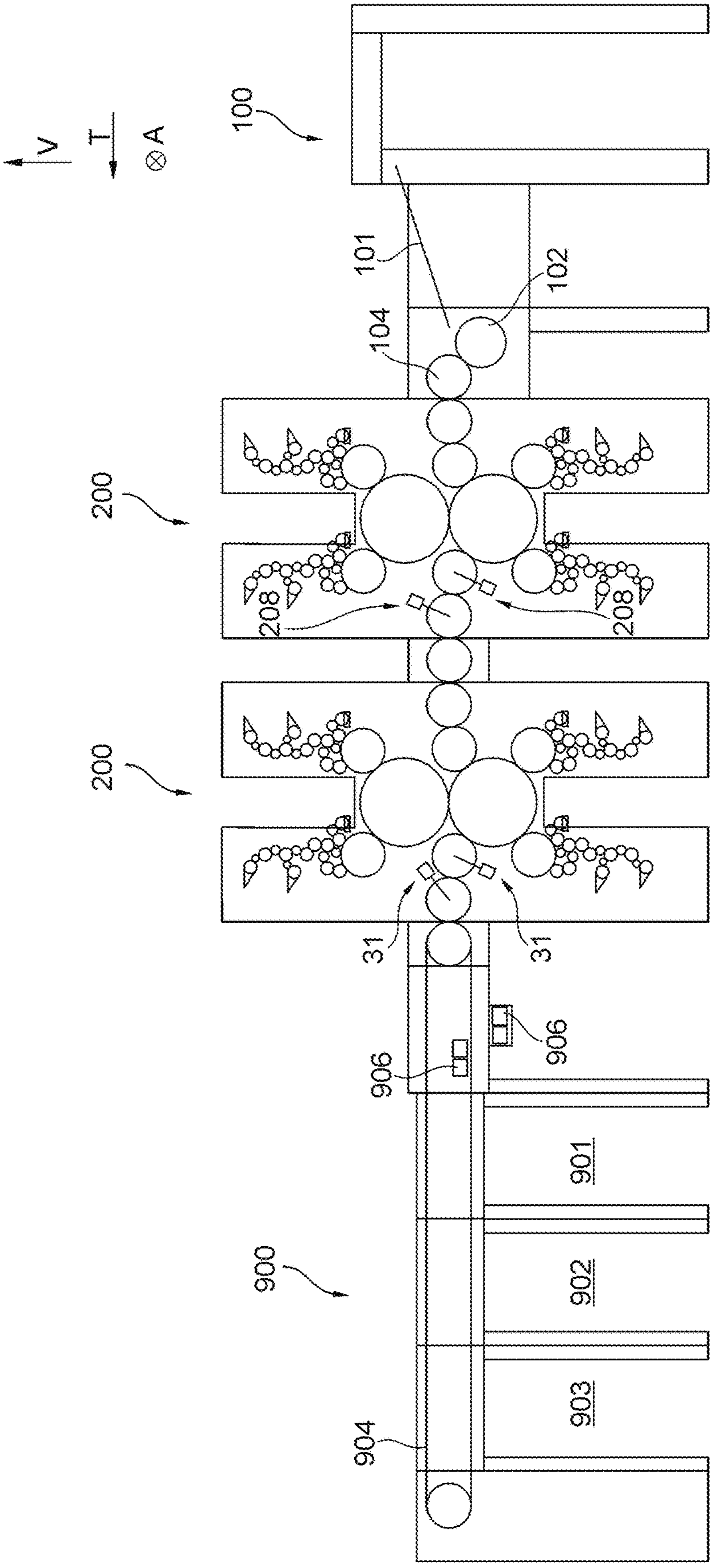
FIG. 10*a* a schematic representation of a sheet-fed printing machine comprising two simultaneous double printing units and inspection devices.
Figure 10B:
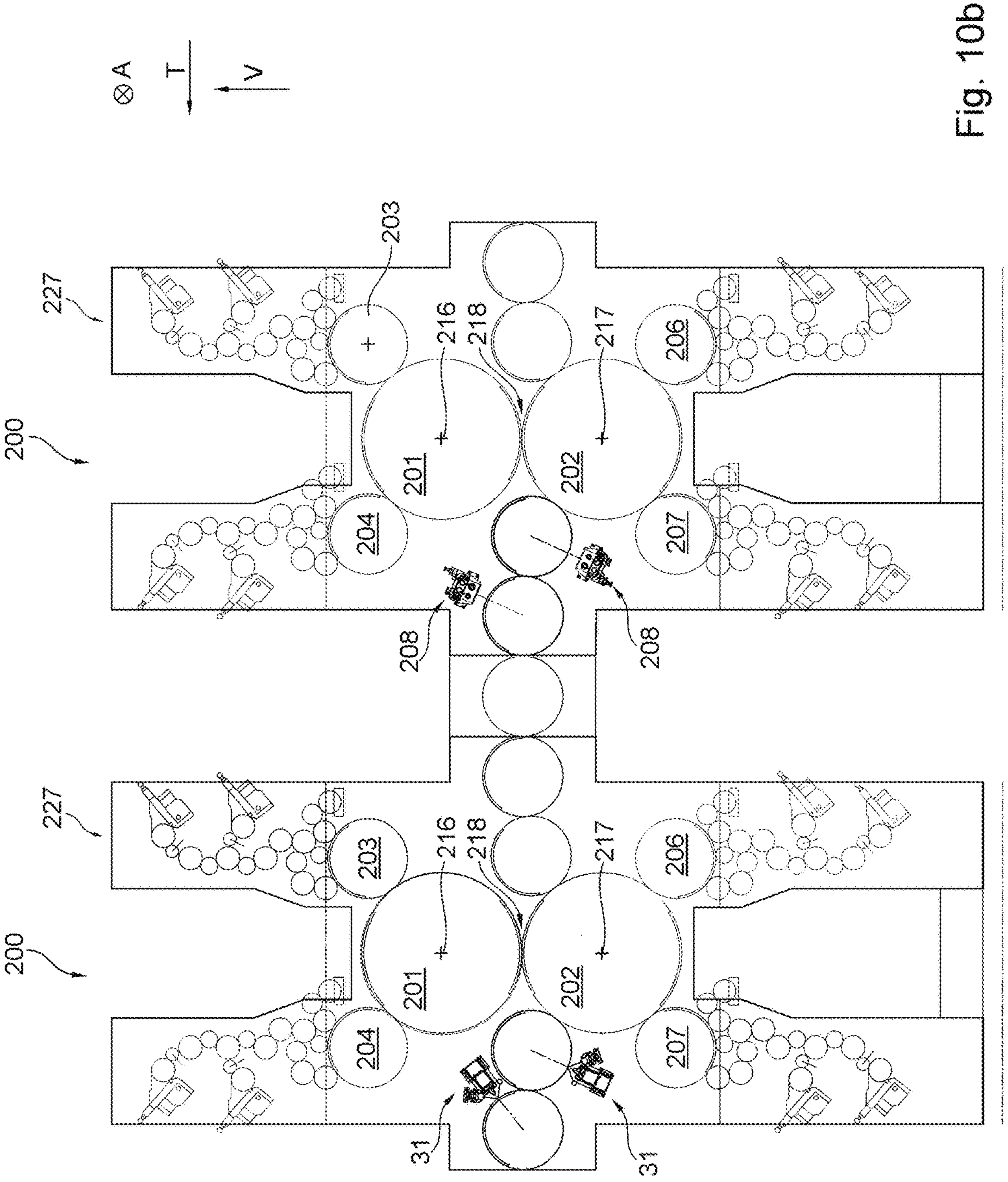
FIG. 10*b* a schematic representation of the two simultaneous double printing units according to FIG. 10*a*.
Figure 11:
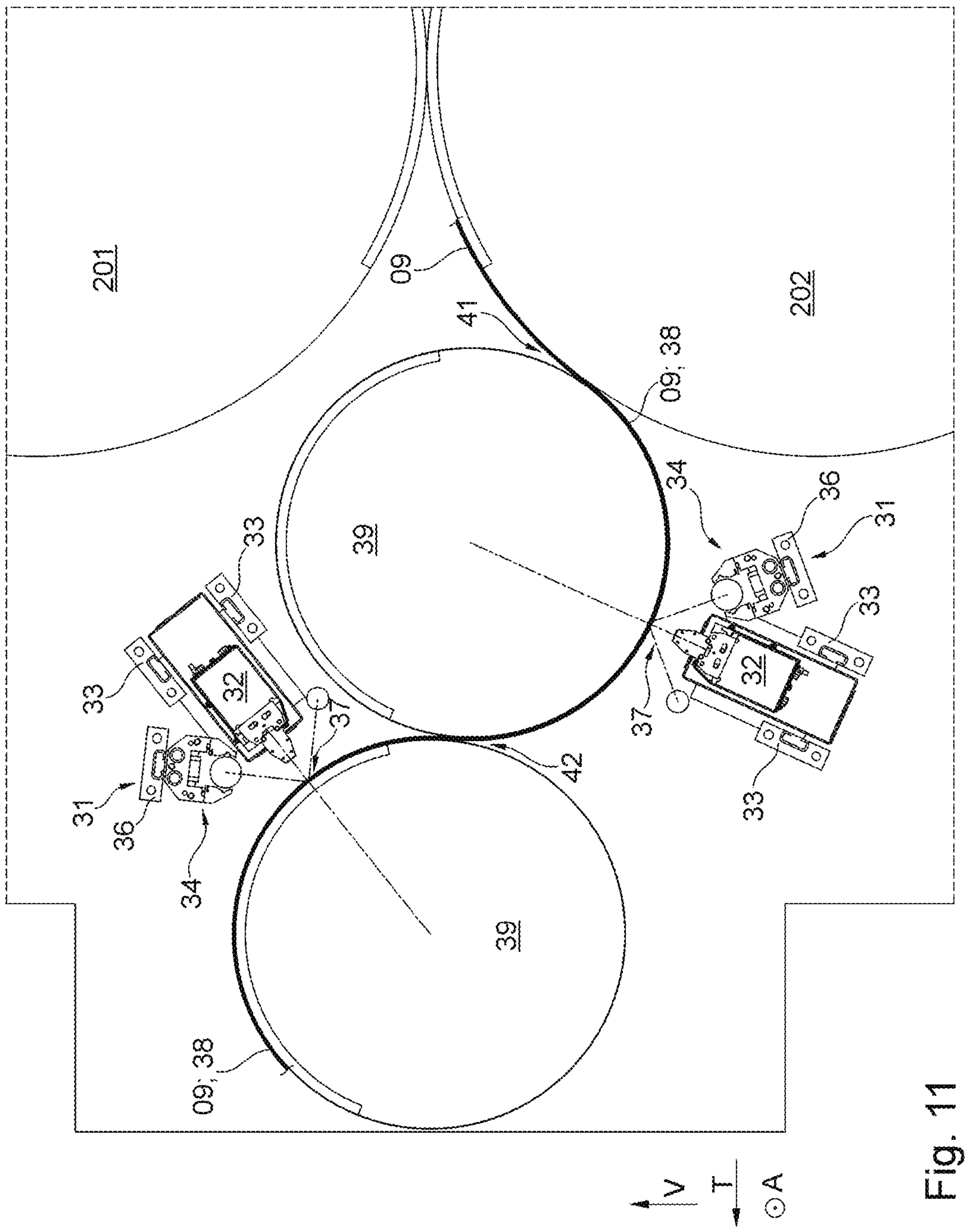
FIG. 11 a schematic representation of a part of a transport path provided for a transport of sheets in the region of two inspection devices downstream from a printing nip of a simultaneous double printing unit.

One exemplary embodiment of such a sheet-fed printing machine 01 comprises a sheet feed device 100, two sheet simultaneous printing units 200, and a delivery device 900. (This is also shown by way of example in FIG. 10). Preferably, at least one drying device 208 and/or curing devices 208 are arranged in a region of the transport path provided for sheets between printing nips of the two sheet simultaneous printing units 200. The at least one simultaneous printing inspection device 31 is preferably arranged in a region of the transport path provided for sheets downstream from the printing nip of the second sheet simultaneous printing unit 200 and preferably upstream from the delivery device 900.

In an additional or alternative refinement, the machine 01 preferably comprises at least one sheet-fed printing unit 500 designed for a letterpress process. Such a sheet-fed printing unit 500 is also referred to as a letterpress printing unit 500. The letterpress process is used, for example, as a numbering printing method. Hereafter, comments are made with regard to a sheet numbering printing unit 500 which, however, also apply accordingly to general letterpress processes. In an additional or alternative refinement, the sheet processing machine 01 preferably comprises at least one sheet-fed printing unit 500 designed for a numbering printing process. Such a sheet-fed printing unit 500 is also referred to as a sheet numbering printing unit 500. The sheet numbering printing unit 500 preferably comprises at least one impression cylinder 501; 502, which is preferably designed as a respective sheet transport cylinder 501; 502 and is preferably rotatably arranged about an axis of rotation 521; 522. For example, the sheet numbering printing unit 500 comprises two cylinders 501; 502 of a first type, which more preferably are designed as respective impression cylinder 501; 502 and/or as respective sheet transport cylinder 501; 502 and/or which are directly in contact with one another and/or are arranged so as to directly cooperate and/or be capable of directly cooperating with one another.

A respective numbering of the sheets and/or of the multiple-up copies of the sheets embodied, in particular, as securities preferably takes place by means of a letterpress process, in particular using at least one numbering forme cylinder 503; 504; 506; 507, which more preferably comprises at least one numbering unit. Preferably, individual numbering units are employed, of which more preferably multiple are arranged on a shared numbering forme cylinder 503; 504; 506; 507. The respective numbering forme cylinder 503; 504; 506; 507 preferably comprises multiple numbering units, which in the circumferential direction thereof are arranged one behind the other on the respective numbering forme cylinder 503; 504; 506; 507, for example at least two or at least four or at least eight or at least twelve, and/or the respective numbering forme cylinder 503; 504; 506; 507 comprises multiple numbering units, which are arranged next to one another in the transverse direction A on the respective numbering forme cylinder 503; 504; 506; 507. The respective at least one numbering unit comprises, for example, a counting unit including multiple symbol rolls, wherein the symbol rolls in each case include set-apart, in particular raised areas in the form of symbols, such as for example numbers and/or letters. Depending on the position of a particular symbol roll, a different symbol is located on the outside, in particular on the outside based on an axis of rotation of the respective numbering forme cylinder 503; 504; 506; 507. Depending on the relative positions of the individual symbol rolls, the outer symbols of the counting unit collectively preferably yield an unambiguous serial number. Preferably, at least one inking unit 518 is provided per numbering forme cylinder 503; 504; 506; 507. Upon contact, the at least one inking unit 518 preferably provides the respective outer symbols of the numbering units of this particular numbering forme cylinder 503; 504; 506; 507 with printing ink. The respective numbering forme cylinder 503; 504; 506; 507 is rotated further and comes in contact with the respective sheet, transferring the printing ink in the form of the symbol onto the sheet. Preferably, the combination of the symbols is changed by the next time this numbering unit makes contact with the inking unit 518 so as to be able to transfer a different marking during the next contact with the corresponding sheet.

Each respective numbering forme cylinder 503; 504; 506; 507 is preferably arranged so as to be directly in contact with a respective impression cylinder 501; 502 and/or so as to directly cooperate and/or be capable of directly cooperating therewith. Preferably, impression cylinders 501; 502 of the sheet numbering printing unit 500 are also designed as sheet transport cylinders 501; 502, in particular regardless of their quantity.

The comments made above and/or below regarding the sheet numbering printing unit 500 also apply accordingly, in general terms, to a letterpress printing unit 500, provided this does not result in any contradictions, in particular with the modification that letterpress forme cylinders 503; 504; 506; 507 preferably carry respective inflexible printing forms, and consequently do not carry any numbering units, as is the case instead with numbering forme cylinders 503; 504; 506; 507.

In an additional or alternative refinement, the sheet processing machine 01 preferably comprises at least one sheet processing unit 600 and/or sheet-fed printing unit 600 designed for a flexographic printing process. Such a sheet-fed printing unit 600 is also referred to as a flexographic printing unit 600. The flexographic printing method is used, for example, as a coating method, in particular as a varnishing method. The flexographic printing unit 600 preferably comprises at least one impression cylinder 601; 602, which is more preferably designed as a respective sheet transport cylinder 601; 602 and is preferably rotatably arranged about an axis of rotation 621; 622. More preferably, the flexographic printing unit 600 comprises two impression cylinders 601; 602, which more preferably are designed as respective sheet transport cylinders 601; 602 and/or which are directly in contact with one another and/or are arranged so as to directly cooperate and/or be capable of directly cooperating with one another. Preferably, impression cylinders 601; 602 of the flexographic printing unit 600 are also designed as sheet transport cylinders 601; 602, in particular regardless of their quantity.

The flexographic printing unit 600 preferably comprises at least one flexographic forme cylinder 603; 604; 606; 607. Preferably, at least one inking unit 618 is provided per flexographic forme cylinder 603; 604; 606; 607. A flexographic forme cylinder 603; 604; 606; 607 shall in particular be understood to mean a forme cylinder 603; 604; 606; 607 provided for a flexographic printing method and/or shall in particular be understood to mean a forme cylinder 603; 604; 606; 607 which is designed to carry at least one preferably exchangeable flexographic printing forme, in particular on the outer cylindrical surface thereof. Each respective flexographic forme cylinder 603; 604; 606; 607 is preferably arranged so as to be directly in contact with a respective impression cylinder 601; 602 and/or so as to directly cooperate and/or be capable of directly cooperating therewith.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet-fed printing machine (01), the sheet-fed printing machine (01) comprising at least one sheet-fed printing unit (200) designed as a sheet simultaneous printing unit (200), which comprises a first collect cylinder (201) and a second collect cylinder (202), which are arranged so as to directly cooperate with one another and which each have an axis of rotation (216; 217); and an axial plane (E1) being a plane (E1) that includes both the axis of rotation (216) of the first collect cylinder (201) and the axis of rotation (217) of the second collect cylinder (202); and a reference plane (E2) being a plane (E2) that includes at least one axis of rotation (216; 217) of one of these collect cylinders (201; 202) and has a horizontal surface normal; and these two collect cylinders (201; 202) being arranged in such a way that the angle of intersection between the axial plane (E1) on the one hand and the reference plane (E2) on the other hand being no more than 45°; and the sheet-fed printing machine (01) comprising at least one simultaneous printing inspection device (31), arranged downstream from the at least one sheet simultaneous printing unit (200), for inspecting printed sheets, and a transport direction (T) being defined at every point along a transport path (09) provided for a transport of sheets and a transverse direction (A) being a horizontal direction (A) that is orthogonal with respect to the transport direction (T) at every point of the transport path (09) provided for the transport of sheets; and the sheet-fed printing machine (01) comprising at least one sheet transport means (39), which is assigned to the simultaneous printing inspection device (31) and which defines a section (38) of the transport path (09) provided for a transport of sheets; and the section (38) comprising an inspection region (37) of the simultaneous printing inspection device (31); and the simultaneous printing inspection device (31) comprising at least one sensor device (32), which in a simultaneous inspection position is arranged so as to be aligned with the inspection region (37) of the simultaneous printing inspection device (31), characterized in that the sheet-fed printing machine (01) has a maximum working width of at least 50 cm, and that the at least one sensor device (32) of the simultaneous printing inspection device (31) has a detection width which is at least 80% of the maximum working width, and that at least one guide device (33) of the at least one sensor device (32) of the simultaneous printing inspection device (31) is provided, which defines a sensor adjustment path that is provided for a movement of the at least one sensor device (32) of the simultaneous printing inspection device (31) and that extends from the simultaneous inspection position at least to a backed-away position of the sensor device (32) of the simultaneous printing inspection device (31) which is designed as a maintenance position, and that the sensor adjustment path extends linearly and parallel to the transverse direction (A), at least between the simultaneous inspection position and the backed-away position of the sensor device (32) of the simultaneous printing inspection device (31) which is designed as the maintenance position.

2. The sheet-fed printing machine according to claim 1, characterized in that the at least one sensor device (32) of the simultaneous printing inspection device (31) is designed as an optical sensor device (32).

3. The sheet-fed printing machine according to claim 2, characterized in that the at least one optical sensor device (13) has a detection width that is at least 90% and/or at least 95% of the maximum working width.

4. The sheet-fed printing machine according to claim 1, characterized in that the at least one sensor device (32) of the simultaneous printing inspection device (31) is designed as a camera (32).

5. The sheet-fed printing machine according to claim 1, characterized in that the at least one sensor device (32) of the simultaneous printing inspection device is designed as a line scan camera (32).

6. The sheet-fed printing machine according to claim 1 characterized in that the simultaneous printing inspection device (31) comprises at least one illumination device (34), which in an illumination position is arranged so as to be aligned with the inspection region (37) of the simultaneous printing inspection device (31), and that at least one backing-away guide device (36) of the at least one illumination device (34) of the simultaneous printing inspection device (31) is provided, which defines an illumination adjustment path that is provided for a movement of the at least one illumination device (34) of the simultaneous printing inspection device (31) and that extends from the illumination position at least to a backed-away position of the illumination device (34) of the simultaneous printing inspection device (31) which is designed as the maintenance position, and that the illumination adjustment path extends linearly and parallel to the transverse direction (A) at least between the illumination position and the backed-away position of the illumination device (34) of the simultaneous printing inspection device (31).

7. The sheet-fed printing machine according to claim 6, characterized in that the illumination position of the at least one illumination device (34) of the simultaneous printing inspection device (31) and the maintenance position of the at least one illumination device (34) of the simultaneous printing inspection device (31) differ in the positioning thereof relative to the transverse direction (A) by a length that corresponds at least to the working width of the sheet-fed printing machine (01) and/or at least to a clear width (W) of the sheet-fed printing machine (01).

8. The sheet-fed printing machine according to claim 7, characterized in that the backing-away guide device (36) of the at least one illumination device (34) of the simultaneous printing inspection device (31) comprises a rail and/or multiple roller elements.

9. The sheet-fed printing machine according to claim 1, characterized in that the sheet transport means (39) is designed as a rotatable sheet transport means (39).

10. The sheet-fed printing machine according to claim 1, characterized in that the sheet transport means (39) is designed as a suction drum (39).

11. The sheet-fed printing machine according to claim 1, characterized in that the sheet transport means (39) forms a first transfer point (41) together with one of the collect cylinders (201; 202).

12. The sheet-fed printing machine according to claim 1, characterized in that the inspection position of the sensor device (32) of the simultaneous printing inspection device (31) and the backed-away position of the sensor device (32) of the simultaneous printing inspection device (31) which is designed as the maintenance position differ in the positioning thereof relative to the transverse direction (A) by a length that corresponds at least to the maximum working width of the sheet-fed printing machine (01) and/or at least to a clear width (W) of the sheet-fed printing machine (01).

13. The sheet-fed printing machine according to claim 12, characterized in that the guide device (33) of the sensor device (32) of the simultaneous printing inspection device (31) comprises a rail and/or multiple roller elements.

14. The sheet-fed printing machine according to claim 1, characterized in that the sheet simultaneous printing unit (200) comprises exactly four forme cylinders (203; 204; 206; 207), of which exactly two are arranged so as to be directly in contact with the first collect cylinder (201) and of which exactly two others are arranged so as to be directly in contact with the second collect cylinder (202).

15. The sheet-fed printing machine according to claim 1, characterized in that the maximum working width of the sheet-fed printing machine is at least 75 cm.

* * * * *